(12) United States Patent
Hoshino et al.

(10) Patent No.: US 7,312,791 B2
(45) Date of Patent: Dec. 25, 2007

(54) DISPLAY UNIT WITH TOUCH PANEL

(75) Inventors: Takeshi Hoshino, Kodaira (JP);
Takeshi Minemoto, Kawasaki (JP);
Yujin Tsukada, Saitama (JP)

(73) Assignee: Hitachi, Ltd., Tokyo (JP)

( * ) Notice: Subject to any disclaimer, the term of this patent is extended or adjusted under 35 U.S.C. 154(b) by 126 days.

(21) Appl. No.: 10/648,289

(22) Filed: Aug. 27, 2003

(65) Prior Publication Data
US 2004/0108995 A1 Jun. 10, 2004

(30) Foreign Application Priority Data
Aug. 28, 2002 (JP) ............... 2002-249192

(51) Int. Cl.
*G09G 5/00* (2006.01)
(52) U.S. Cl. ..................................... 345/173
(58) Field of Classification Search ........ 345/173–178; 178/18.01, 20.01; 715/701, 702
See application file for complete search history.

(56) References Cited

U.S. PATENT DOCUMENTS

| 6,067,081 A * | 5/2000 | Hahlganss et al. .......... 345/173 |
| 6,822,635 B2 * | 11/2004 | Shahoian et al. ........... 345/156 |
| 2002/0008691 A1 * | 1/2002 | Hanajima et al. ........... 345/173 |
| 2002/0149561 A1 * | 10/2002 | Fukumoto et al. .......... 345/156 |

FOREIGN PATENT DOCUMENTS

| JP | A-5-216587 | 8/1993 |
| JP | A-08-221202 | 8/1996 |
| JP | 10-171600 | 2/1998 |
| JP | A-10-154042 | 6/1998 |
| JP | 10-289061 | 10/1998 |
| JP | A-11-203044 | 7/1999 |
| JP | 2000-222129 | 8/2000 |

OTHER PUBLICATIONS

"Touch Engine: A Tactile Display for Handheld Devices", by Ivan Poupyrev et al., CHI 2002, Apr. 20-25, 2002, pp. 644-655.
"Active Click: Tactile Feedback for Touch Panels", by Masaaki Fukumoto et al., CHI 2001, Mar. 31-Apr. 5, 2001, pp. 121-122.

* cited by examiner

*Primary Examiner*—Amr A. Awad
*Assistant Examiner*—Stephen Sherman
(74) *Attorney, Agent, or Firm*—Mattingly, Stanger, Malur & Brundidge, P.C.

(57) ABSTRACT

There is provided a display unit including a touch panel disposed on a display screen of a display panel to detect a touch position of a pointing device, operation being conducted by touching a touch operation member displayed on the screen. The display unit includes a sensor for sensing a pushing pressure caused when touching the touch operation member, and a control section for conducting first processing concerning the touch operation member pushed by the pointing device when the pressure sensed by the sensing unit satisfies a first predetermined pressure condition, and conducting second processing concerning the touch operation member, when the pushing pressure has changed from the first condition to a second one. Upon the change from the first condition to the second one, a function of moving the screen in a direction of pushing pressure caused by the pointer is executed by the second processing.

7 Claims, 21 Drawing Sheets

FIG.2
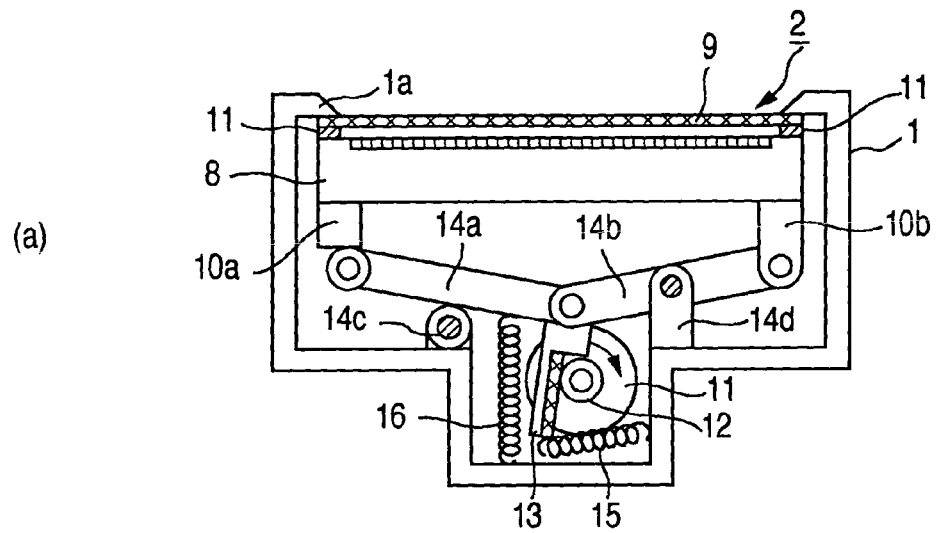
(a)
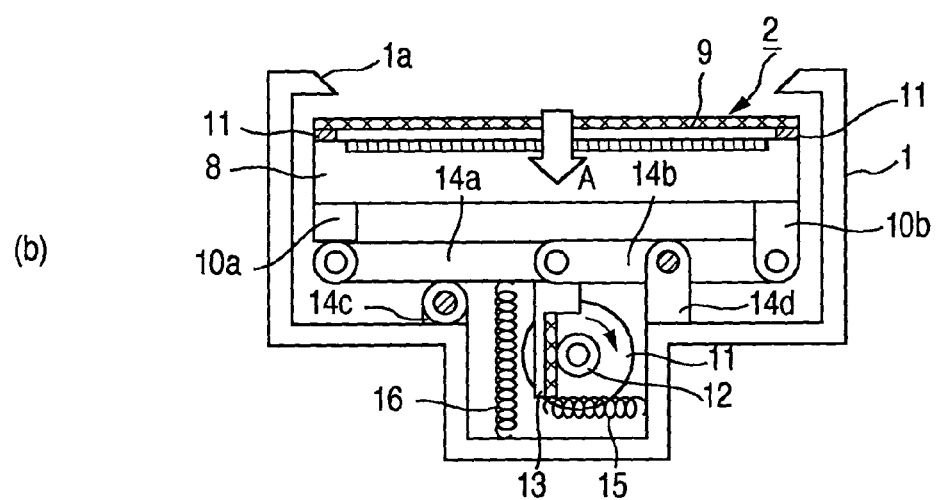
(b)
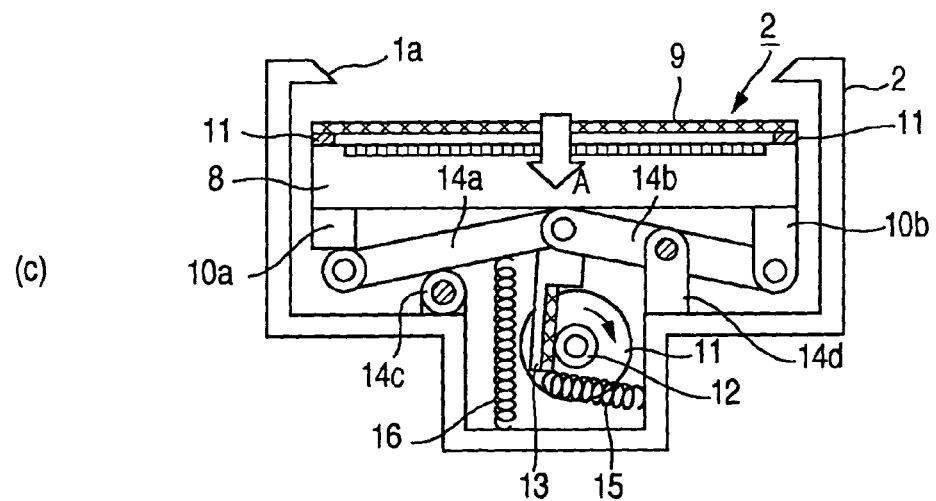
(c)

FIG.4
(a)
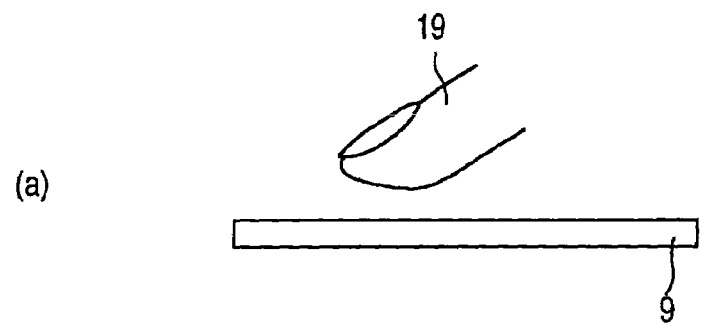
(b)
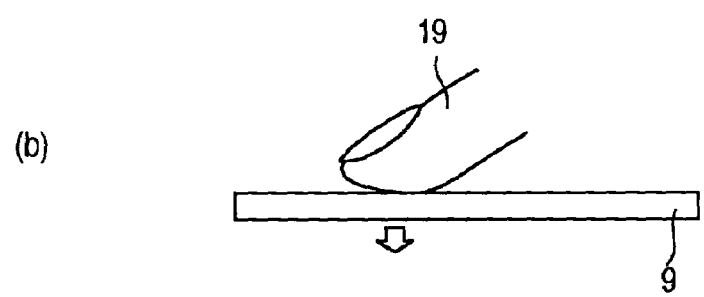
(c)
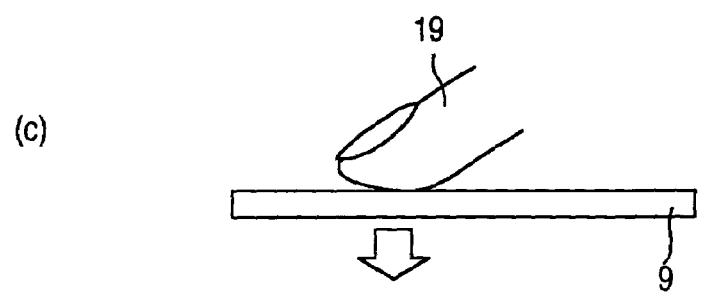

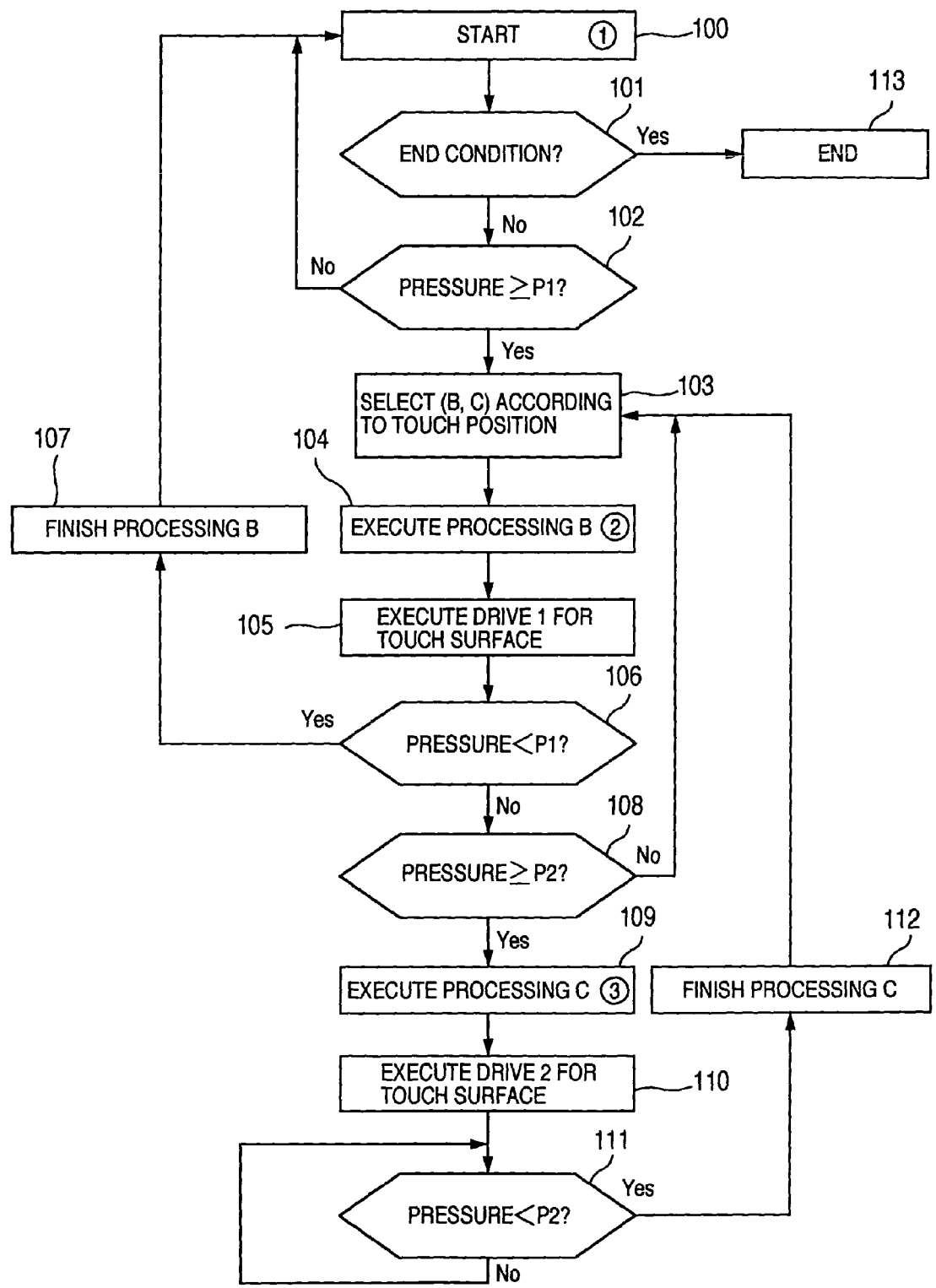

FIG.12A
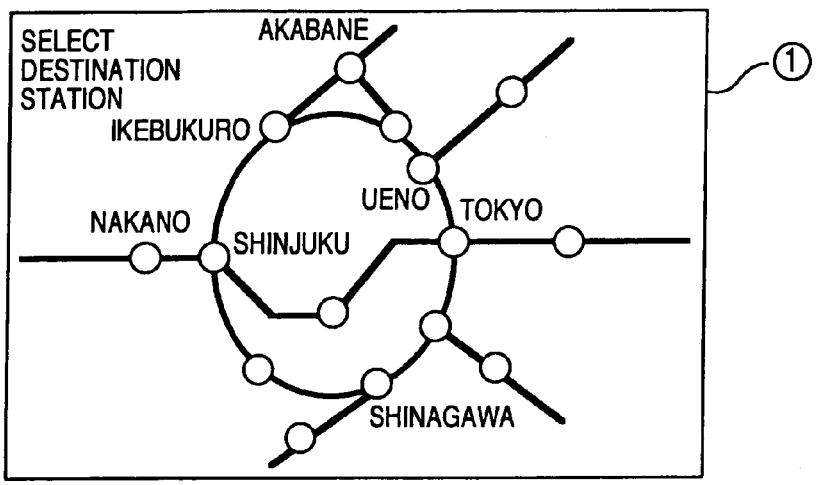
TOUCH
FIG.12B
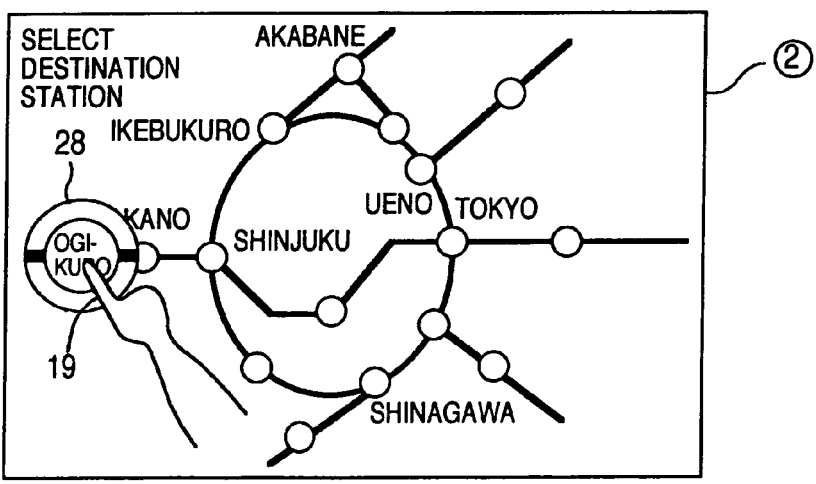
PRESS
FIG.12C
```
                                            CANCEL
PUT YOUR CASH OR CARD INTO THE MACHINE
       TICKET              TO OGIKUBO
       AMOUNT OF
       PURCHASE MONEY      ¥160
       AMOUNT OF MONEY
       PUT INTO THE MACHINE ¥0
```

HEIGHT OF PANEL SURFACE
———— L: HIGHEST LIMIT
———— A
———— B
———— C
———— 0: LOWEST LIMIT

DISPLAY UNIT WITH TOUCH PANEL

CROSS-REFERENCE TO RELATED APPLICATION

The present application relates to subject matters described in application Ser. No. 10/230,100 filed on Aug. 29, 2002 assigned to the assignee of the present application. The disclosures of this application are incorporated herein by reference.

BACKGROUND OF THE INVENTION

The present invention relates to a display unit with touch panel used in terminal devices of installation type or portable type.

In recent years, terminal devices have become widely used in various business worlds. For example, ATMs (Automatic Tellers Machines) are installed in banks, and ticket selling machines and map guide machines are installed at railroad stations. Thus, a part of business to be conducted in banks and at railroad stations can be executed. In stores such as fast-food stores as well, terminal devices are used for commodity order processing in some cases (as described in, for example, JP-A-5-216587). In addition, terminal devices that receive delivered contents by using a communication network such as the Internet, and terminal devices for web perusal (browsing) are also implemented or proposed.

In such a terminal device, a display unit is provided. Various works as described above can be effected by operating an input unit such as a keyboard while watching information such as a message displayed on a display screen. A display unit with touch panel is becoming used. In the display unit with touch panel, its display screen is provided with a function of serving as input means, and various works are executed by effecting screen operations in accordance with messages and menus displayed on the display screen.

In such a display unit with touch panel, operation is conducted by directly touching the display screen with a fingertip. Therefore, excellent operation performance, such as facilitated operation and reduced operation mistakes, can be implemented. In an operation section such as a keyboard as well, the number of operation buttons can be reduced. Therefore, the terminal device itself can be reduced in size, and its installation area can also be made small. This results in a merit that the degree of freedom in installation place in a store, bank, station, or other places becomes higher.

In the conventional display unit with touch panel, an image of the input means including touch operation members, such as operation buttons (touch buttons), is displayed on the display screen. The input means is recognized visually by a customer or user. Under this recognition, the customer or user touches a place on the input means desired to be operated. Therefore, the following problems occur.

First, the touch operation area of the touch operation members for the user to effect touch operation is displayed on the display screen. Therefore, the touch operation area is on the same plane as portions other than the touch operation area are. Unlike the operation unit such as a keyboard, feeling obtained by touching the touch operation area is the same as feeling obtained by touching the portions other than the touch operation area are. Even if the position touched by the fingertip deviates from the desired touch operation area, there may be some instances where the user does not become aware of that.

Especially when displaying some operation buttons together with a guide message as the touch members, there are instances where the operation buttons are displayed in various places on the display screen. When operating operation buttons thus displayed, there may be some instances where the touch position of the fingertip deviates from the display position of a desired operation button. Even if such deviation is slight, the operation button is considered to have not been touched, and the button does not function. However, the user thinks that he or she has touched the operation button, and there are some instances where the user does not become aware that he or she has not touched the operation button. As a result, operation of touching the same operation button again is needed. Therefore, the user needs to recognize that he or she has not touched the operation button. However, this results in a problem that this recognition needs some time.

There are also some cases where a large number of operation buttons are displayed on the display screen so as to be adjacent to each other. In such a case, each operation button is displayed so as to be comparatively small. Even if the touch position of the fingertip deviates from a display position of a desired operation button slightly, therefore, the fingertip might touch an adjacent operation button. The conventional display unit with touch panel is configured so as to immediately function when a displayed touch button is touched. If the touch position deviates and the fingertip touches an adjacent operation button, therefore, the adjacent operation button functions. This results in a problem that it is necessary to stop the function and conduct operation again.

SUMMARY OF THE INVENTION

An object of the present invention is to provide a display unit free from the problems and capable of recognizing easily that the fingertip has touched a touch operation member such as an operation button displayed on the display screen and recognizing easily and certainly that the touch operation member has been operated.

In order to achieve the object, the present invention provides a display unit with touch panel including a touch panel disposed on a display screen of a display panel to detect a touch position of a pointer, operation being conducted by touching a touch operation member displayed on the display screen, the display unit with touch panel including a sensor for sensing a pushing pressure P caused by the pointer when touching the touch operation member, and a control section for conducting first processing concerning the touch operation member pushed by the pointer when the pressure P sensed by the sensor satisfies a relation $P1 \leq P < P2$ with respect to previously set pressures P1 and P2 (where $P1 < P2$), and conducting second processing concerning the touch operation member pushed by the pointer when the pushing pressure P has changed from $P1 \leq P < P2$ to $P2 \leq P$, wherein when the pushing pressure P has changed from $P1 \leq P < P2$ to $P2 \leq P$ where the touch operation member is regarded as pressed, a function of moving the display screen in a direction of pushing pressure caused by the pointer is executed by the second processing.

At least one of processing of making display concerning the touch operation member different, and processing of executing the function of moving the display screen in a direction of pushing pressure caused by the pointer is conducted by the first processing.

In the case where the processing of executing the function of moving the display screen in a direction of pushing pressure caused by the pointer is conducted by the first processing, its travel quantity or a rate of change of the travel quantity for an increase of the pushing pressure is different from that in the travel of the display screen conducted by the second processing.

Furthermore, in accordance with the present invention, the function of moving the display screen in a direction of pushing pressure caused by the pointer is conducted by the first processing, and instead of the function of moving the display screen in a direction of pushing pressure caused by the pointer, a function of moving the display screen in a direction opposite to that of pushing pressure caused by the pointer is conducted by the second processing.

In addition, the present invention provides a display unit with touch panel including a touch panel disposed on a display screen of a display panel to detect a touch position of a pointer, operation being conducted by touching a touch operation member displayed on the display screen, the display unit with touch panel including a storage section for storing data that represent a relation between a position and a height as regards contents displayed on the display screen, and a control section for reading height data corresponding to coordinates of a detected touch position from the storage section, and conducting processing of moving the display screen with a drive quantity depending upon the height data.

In addition, the present invention provides a display unit with touch panel including a touch panel disposed on a display screen of a display panel to detect a touch position of pointer, operation being conducted by touching a touch operation member displayed on the display screen, the display unit with touch panel including a sensor for sensing a pushing pressure P caused by the pointer when touching the touch operation member, and a control section for conducting processing of moving the display screen to a predetermined first height, when a transition is effected from a state in which the pointer touches an area where the touch operation member is not displayed to a state in which the pointer touches an area where the touch operation member is displayed, and for conducting processing of moving the display screen to a predetermined second height and causing a function of the touch operation member to be executed, when the pushing pressure P is at least a predetermined value in a state in which the pointer touches an area where the touch operation member is displayed.

The first height is a height that is relatively higher than a height of the display screen in an immediately preceding state, and the second height is a height that is relatively lower than a height of the display screen in an immediately preceding state.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing operation of a travel mechanism shown in FIGS. 1A to 1C;

FIG. 4 is a diagram showing states of a fingertip with respect to a touch panel in FIGS. 1A to 1C;

FIG. 8 is a flow chart showing a first concrete example of function control of a controller shown in FIG. 6;

FIGS. 12A, 12B and 12C are diagrams showing other screens when a first embodiment of the present invention is used as a display unit for an ATM and screen examples shown in FIGS. 9A to 9C and 10A to 10C are used;

DESCRIPTION OF THE EMBODIMENTS

Hereafter, embodiments of the present invention will be described with reference to the drawings.

Figure 1A:
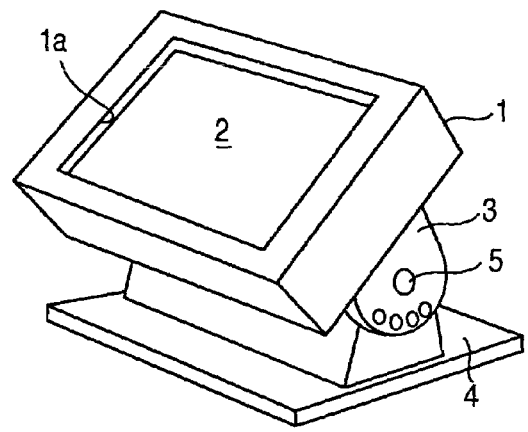
FIGS. 1A, 1B and 1C are configuration diagrams showing a first embodiment of a display unit with touch panel according to the present invention.
Figure 1B:
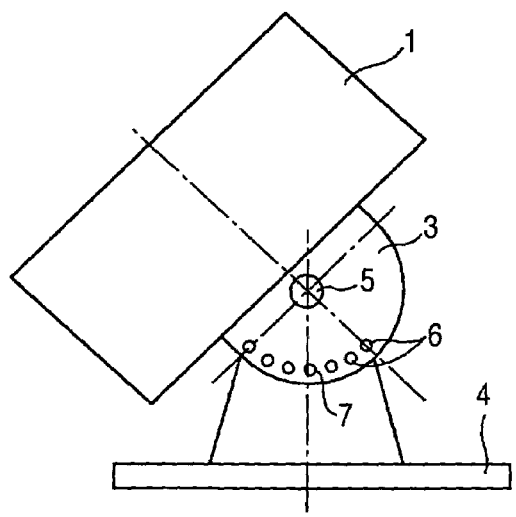
Figure 1C:
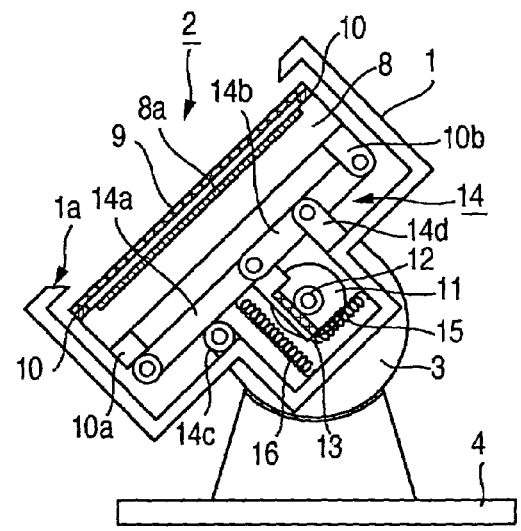

FIGS. 1A, 1B and 1C are configuration diagrams showing a first embodiment of a display unit with touch panel according to the present invention. FIG. 1A is an oblique exterior view, and FIG. 1B is a side view. FIG. 1C is a sectional view. Reference numeral 1 denotes a cabinet, 1a an opening, 2 a display screen, 3 a fixture, 4 a stand, 5 an axis of rotation, 6 a pin hole, 7 a pin, 8 a display panel, 8a a display surface, 9 a touch panel, 10, 10a and 10b support members, 11 a drive motor, 12 a rotary gear, 13 a spur gear, 14 a link mechanism, 14a and 14b links, 14c and 14d support members, and 15 and 16 tension springs.

With reference to FIGS. 1A to 1C, a rectangular opening 1a is formed in the front face of a box-shaped cabinet 1. The display screen 2 is provided in the opening 1a. Although not illustrated, members that can be touched and operated, such as operation buttons and messages, (hereafter referred to as touch operation members) are displayed on the display screen 2. By conducting touch operation on such operation members, a device (such as, for example, an ATM or a ticket machine) using a display unit, which is an embodiment can be activated.

The fixture 3 is provided on the rear side, which is opposite to the opening 1a in the cabinet 1, integrally therewith. The fixture 3 is attached to the stand 4 via the axis of rotation 5. The fixture 3, and consequently the cabinet 1 can be rotated with respect to the stand 4 around the axis of rotation 5. By rotating the cabinet 1 in this way, the direction of the display screen 2 in the vertical direction can be changed.

Such a configuration that the direction of the display screen 2 can be changed continuously may also be adopted. However, the direction of the display screen 2 can be changed now step by step. As shown in FIG. 1B, therefore, a plurality of pin holes 6 are provided on the side surface portion of the fixture 3 around the axis of rotation 5. The pin 7 fitting in a pin hole 6 is provided on the stand 4 so as to be opposite to a point on an array line of the pin holes 6 and so as to be able to be pushed in the stand 4. If the cabinet 1 is rotated around the rotation axis 5 and the display screen 2 is set to a predetermined direction, then the pin 7 can be inserted in a nearby pin hole 6 and the display screen 2 is stabilized nearly in the predetermined direction.

In this way, the pin holes 6 and the pin 7 form means for adjusting the direction (angle) of the display screen. The display screen 2 can be set in as many directions as the number of the pin holes 6.

As shown in FIG. 1C, display means including the display panel 8 and the touch panel 9 is incorporated in the cabinet 1. The display surface 8a of the display panel 8 and the touch panel 9 form the display screen 2. The touch panel 9 is opposed to the display surface 8a. A peripheral part of the touch panel 9 is supported by the display panel 8 via the support member 10.

A travel mechanism for moving the display screen 2 backward and forward with respect to the opening 1a of the cabinet 1 is disposed in the cabinet 1. The display screen 2 can be drawn in from the opening 1a in response to pushing pressure against the touch panel 9 caused by a fingertip.

With reference to FIG. 1C, the travel mechanism is formed of the drive motor 11 and the link mechanism 14. The travel mechanism is disposed in an inner part than the display panel 8 in the cabinet 1.

In a concrete configuration example of the travel mechanism, the rotary gear 12 is fixed to a rotation axis of the drive motor 11, and the spur gear 13 engages with the rotary gear. The link mechanism 14 is attached to a first end of the spur gear 13. The link mechanism 14 includes two links 14a and 14b disposed substantially in opposite directions to each other and attached at first ends to the spur gear 13 so as to be rotatable, a support member 14c for supporting a substantially central part of the link 14a, and a support member 14d linked to a substantially central part of the link 14b so as to be rotatable to support the link 14b. The link mechanism 14 supports at a second end of the link 14a the support member 10a located at a first end of the display panel 8. A second end of the link 14b is linked to the support member 10b located at a second end of the display panel 8 so as to be rotatable.

A second end of the spur gear 13 is pulled counterclockwise around the rotary gear 12 in FIG. 1C by the tension spring 15. As a result, the spur gear 13 is pushed against the rotary gear 12. In addition, the tension spring 16 for always keeping the link mechanism 14 at a favorable balance state is also provided.

The display means including the display panel 8 and the touch panel 9 is supported by the link mechanism 14 so as to locate the touch panel 9 in the vicinity of the opening 1a of the cabinet 1.

FIG. 2 is a diagram showing operation of the travel mechanism. Components corresponding to those in FIG. 1 are denoted by like characters.

In FIG. 2, (a) shows an initial state of the display screen 2. The spur gear 13 is in a state in which it has moved into the innermost position, i.e., a state in which the spur gear 13 engages with the rotary gear 12 at an end of the spur gear 13 on the links 14a and 14b side. In this state, ends of the links 14a and 14b located on the spur gear 13 side are pulled by the spur gear 13, and the link 14a is rotated clockwise around the support member 14c whereas the link 14b is rotated counterclockwise around the support member 14d. As a result, the support members 10a and 10b are raised by the links 14a and 14b, and the touch panel 9 of the display screen is disposed in contact with the opening 1a or adjacent to the opening 1a.

If the drive motor 11 is rotated clockwise by a predetermined rotation quantity, then the spur gear 13 is moved toward the display panel 8 as shown in FIG. 2, (b), and the ends of the links 14a and 14b are pushed toward the display panel 8 by the spur gear 13. As a result, the link 14a is rotated counterclockwise around the support member 14c and the link 4b is rotated clockwise around the support member 14d. The display panel 8 is moved in a direction indicated by an arrow A, and the display screen 2 is retreated (drawn in).

When the drive motor is driven clockwise at its maximum, the spur gear 13 engages at its end located on the tension spring 15 side with the rotary gear 12 as shown in FIG. 2, (c). In this state, the links 14a and 14b are rotated in the above-described direction at its maximum. As a result, the display panel 8 is moved in the direction indicated by the arrow A at its maximum, and the display screen 2 is drawn in from the opening 1a at its maximum.

If the drive motor 11 is rotated counterclockwise from the state shown in FIG. 2, (b) or (c), then the drive motor 11 is finally returned to the initial state shown in FIG. 2, (a). The drive motor 11 has an angle sensor, and the drive motor 11 can always sense the rotation angle of itself and control the rotation angle.

Although the gear mechanism is used here as the drive means for the link mechanism 14, other mechanisms such as cams may also be used.

Figure 3A:
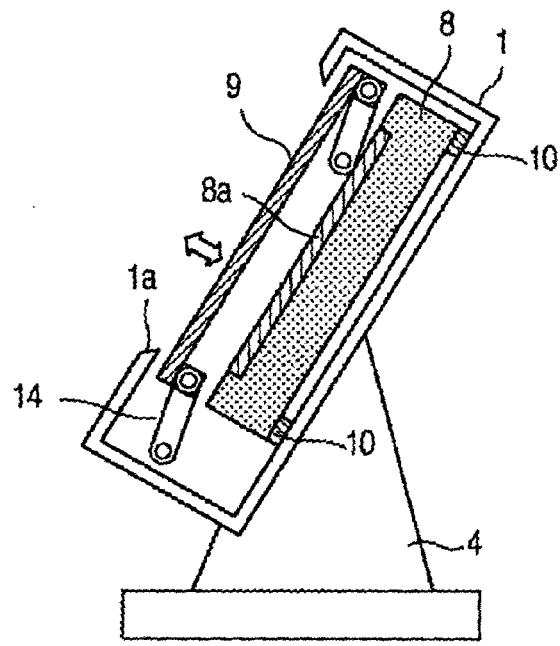
FIGS. 3A and 3B are diagrams schematically showing another concrete example of display means having a travel mechanism in a first embodiment of a display unit with touch panel according to the present invention.
Figure 3B:
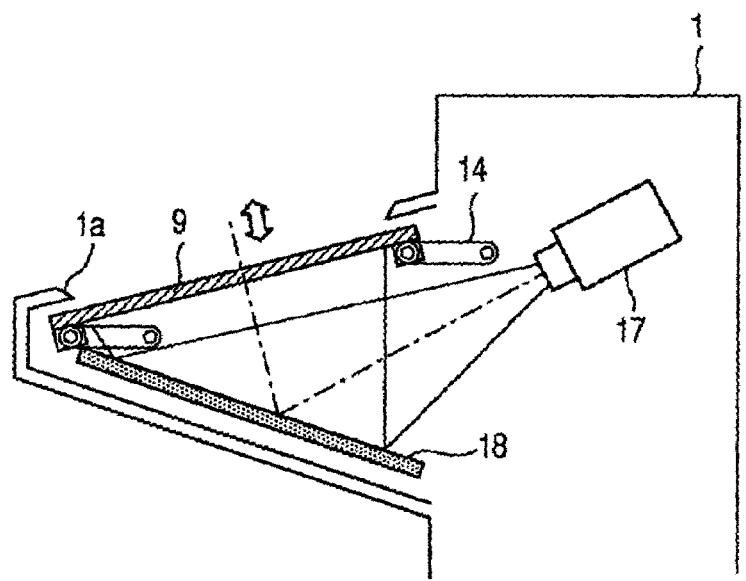

FIGS. 3A and 3B are sectional views schematically showing other concrete examples of display means having the travel mechanism in the cabinet 1 shown in FIGS. 1A to 1C. In FIG. 3A, a display unit is not moved, and only a touch panel section is made movable. A display unit 8 is a cathode-ray tube, a liquid crystal panel, or a plasma display panel. FIG. 3B shows the case of a projector such as a liquid crystal projector, and a liquid crystal panel or a cathode-ray tube is used as a display panel 8. Reference numeral 17 denotes a projection unit, and reference numeral 18 denotes a mirror. Components corresponding to those shown in the preceding drawings are denoted by like characters.

With reference to FIG. 3A, a display panel 8 is supported by a support member 10 in a cabinet 1. A touch panel 9 is supported by a link mechanism 14, and the touch panel 9 can be moved as described with reference to FIG. 2.

The touch panel 9 is configured to have a transparent film, which covers the whole of the display surface 8a. The touch panel 9 has a function of sensing the fact that the user has touched the touch panel 9 with a fingertip (touch sensing: it is a function similar to a function of sensing touch of a fingertip given to the touch panel 9 in the conventional touch panel). The touch panel 9 has a function of detecting the touch position (position detection: it is a function similar to a function of sensing a position where the finger tip has touched the touch panel 9 in the conventional touch panel). In addition, in this concrete example, the touch panel 9 has a function of detecting the pressure with which the fingertip touches the touch panel 9 (pressure detection function) as well. As for the method for providing the touch panel 9 with the pressure detection function, a pressure sensor is provided in the touch panel 9 to detect the pressure. Such a pressure sensor may be attached to any position, such as an attaching section of the link mechanism to the touch panel 9, so long as the pushing pressure can be sensed in the position. Since in this embodiment the moved section is light-weighted, the travel mechanism may be made small in scale. It is effective to use the touch panel 9 under the condition that the position relation between the touch panel 9 and the display panel 8 is in such a range that the influence of the parallax is small.

In the concrete example shown in FIG. 3B, a projector including the projection unit 17, the mirror 18 and a screen (not illustrated) is provided in a cabinet 1. The projection unit 17 includes a liquid crystal panel and a cathode-ray tube for generating an image. A touch panel 9 is disposed outside the screen and integrally with the screen. The screen and the touch panel 9 are supported near an opening 1a of the cabinet 1 by a link mechanism 14.

The projection unit 17 has a projection lens, which is not illustrated. The image from the projection unit 17 is projected onto the screen via the mirror 18. However, the image projected onto the screen is expanded by the projection lens. In the case where the projection unit 17 is disposed so as to be opposed directly to the screen, the mirror 18 can be omitted.

Besides the touch detection and the touch position detection with respect to the touch panel 9, this concrete example also has a function (pressure detection) of detecting pressure when the touch panel 9 is touched. As a method for providing a pressure detection function, the touch panel 9 is provided with a function of touch sensing, position detection of the touch position, and pressure detection in the touch position. Or it is possible to dispose a pressure sensor between the link mechanism 14 and the touch panel 9 and conduct pressure detection by using the pressure sensor.

However, the fingertip may be judged to have touched the touch panel 9 when the touch position of the fingertip is detected by the touch panel 9. In this embodiment, the travel mechanism is small in scale, and there is no parallax. Since the screen itself moves, it is effective if this embodiment is used in such a range that changes in position and size after the projection are small.

FIG. 4 is a diagram showing states of a fingertip with respect to the touch panel 9 in the first embodiment. In FIG. 4, (a) shows a state in which a fingertip 19 does not touch the touch panel 9. In FIG. 4, (b) and (c) show states in which the fingertip 9 has touched the touch panel 9. FIG. 4, (b) shows a state in which the fingertip 19 touches the touch panel 9 lightly, whereas FIG. 4, (c) shows a state in which the fingertip 19 touches the touch panel 9 strongly so as to press the touch panel 9. In the ensuing description, it is supposed that a pointing device is a fingertip. However, other input means such as a pen or a pen-type input device may also be used.

Figure 5:
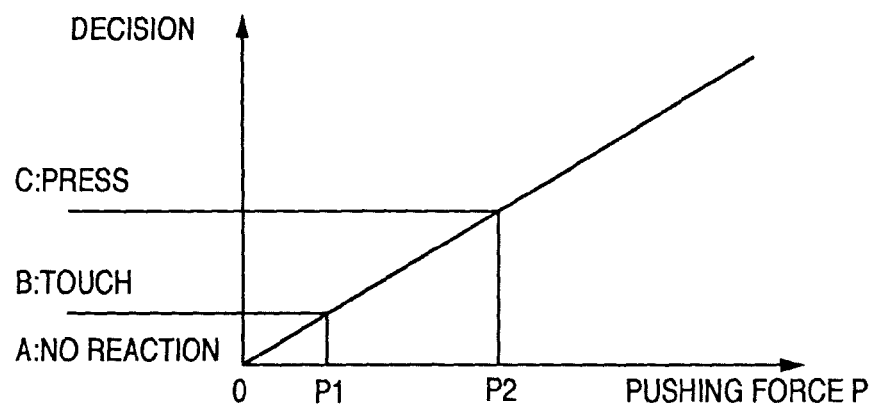
FIG. 5 is a diagram showing a decision of a fingertip state shown in FIG. 4 as compared with a pressure detected by a pressure sensor.

FIG. 5 is a diagram showing a decision of the state of the fingertip 19 shown in FIG. 4 as a function of pressure detected by the pressure sensor. (The decision is effected by a control section described later.) The abscissa indicates a pressure (force pushing the touch panel 9, hereafter referred to as pushing pressure) P applied to the touch panel 9. The ordinate indicates a result of decision for the pushing pressure P.

With reference to FIG. 5, a value of a weak pressure P1 and a value of a strong pressure P2 are previously set. When the pushing pressure P applied to the touch panel 9 is $0 \leq P < P1$, the pushing pressure to the touch panel 9 is judged to be absent (there is no response: the touch panel 9 is not touched). When $P1 \leq P < P2$, it is judged that the touch panel 9 is touched (the above-described "touch sensing") and the touch position is detected. When the pushing pressure P is $P2 \leq P$, it means that the touch panel 9 is subject to such strong pushing pressure as to press the touch panel 9, and the touch panel 9 is judged to be pressed (the above-described "pressure sensing").

The state shown in FIG. 4, (a) corresponds to the state in which $0 \leq P < P1$ shown in FIG. 5. In this state, the touch panel 9 is judged not to be touched. FIG. 4, (b) shows the state in which the fingertip 19 has touched the touch panel 9. If at this time $0 \leq P < P1$, however, then it is judged from FIG. 5 that the touch panel 9 is not touched. If $P1 \leq P < P2$, then it is judged that the touch panel 9 is only touched, but it is not pressed. FIG. 4, (c) shows a state in which the fingertip 19 touches the touch panel 9 so as to press it, and corresponds to the state in which $P2 \leq P$ in FIG. 5. At this time it is judged that the touch panel 9 is pressed.

As heretofore described, in this embodiment, two-stage sensing using the pressure of the touch panel 9 is made possible.

By the way, the pressure P1 (>0) is set in order to prevent a false decision that the touch panel 9 has been touched, when an improper pressure is applied to the touch panel 9 by, for example, vibration.

Figure 6:
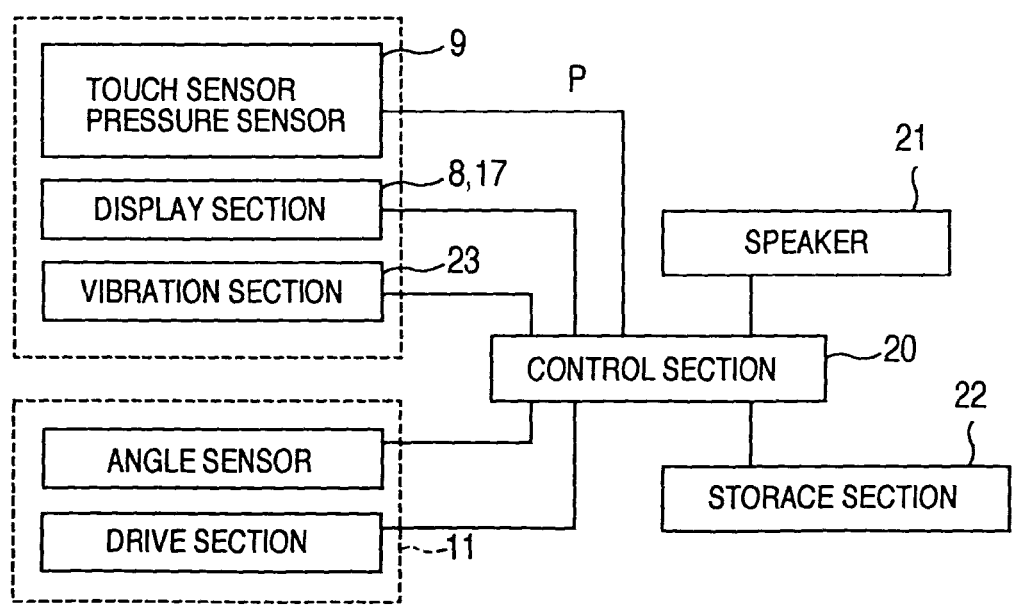
FIG. 6 is a block diagram showing a principal part of a concrete example of a circuit configuration in an embodiment shown in FIGS. 1A to 1C.

FIG. 6 is a block diagram showing a principal part of a concrete example of a circuit configuration in the first embodiment. Reference numeral 20 denotes a control section, 21 a speaker, 22 a storage section, and 23 a vibration section. Components corresponding to those in FIGS. 1A to 1C and FIGS. 3A and 3B are denoted by like characters, and duplicated description will be omitted.

With reference to FIG. 6, the touch panel 9 includes a touch sensor and a pressure sensor. An output detected by the touch sensor and a pressure P detected by the pressure sensor are supplied to the control section 20. The control section 20 detects a touch position of the fingertip on the touch panel 9 on the basis of the output detected by the touch sensor, and effects a decision described with reference to FIG. 5, on the basis of the detected pressure P. According to a result of the decision, the control section 20 controls the display panel 8 and the projection unit 17 as described later, on the basis of data stored in the storage section 22. The control section 20 makes the speaker 21 conduct predetermined voice reproduction.

With respect to preset pressure values P1 and P2, the control section 20 effects a decision whether P<P1 (not touched), P1≦P<P2 (touched, "touch sensing"), or P2<P (pressed, "pressure sensing"). On the basis of the decision, the control section 20 controls the drive motor 11.

Figure 7A:
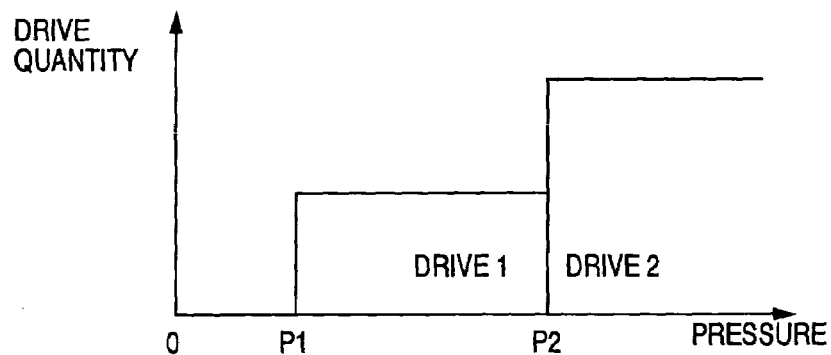
FIGS. 7A, 7B and 7C are diagrams showing a drive quantity of a display screen as a function of detected pressure of a pressure sensor in a first embodiment shown in FIGS. 1A to 1C.
Figure 7B:
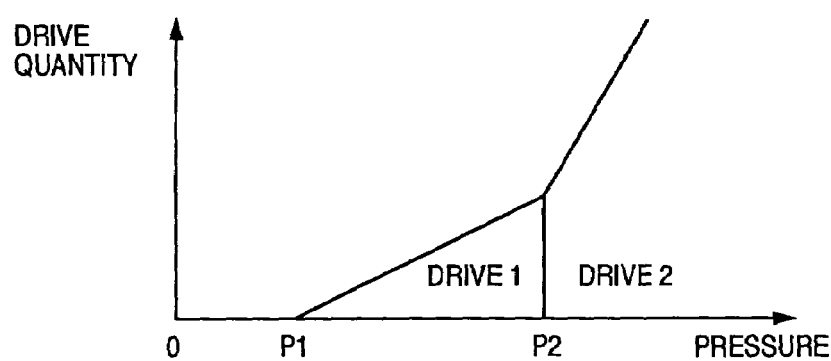
Figure 7C:
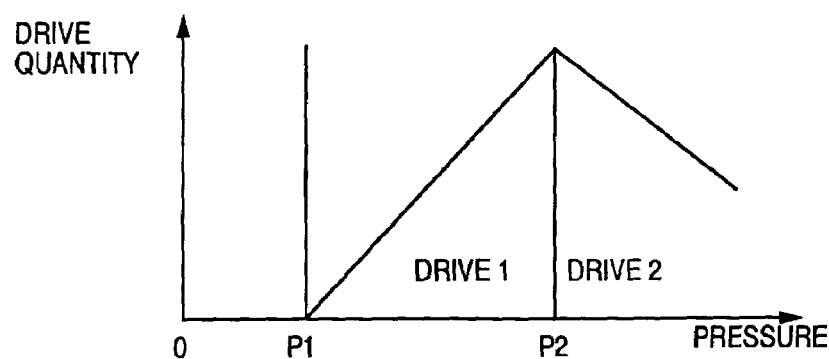

With reference to FIGS. 7A, 7B and 7C, drive quantities on the display screen 2 obtained by using the drive motor 11 will now be described. By taking a position on the display screen 2 in the state shown in FIG. 2, (a) as the reference, FIGS. 7A to 7C represent the drive quantity from the reference position.

With reference to FIG. 7A, upon judging that P<P1, the control section 20 sets the drive quantity of the display screen 2 given by the drive motor 11 equal to zero, and set the display screen 2 to the state shown in FIG. 2, (a). Upon judging that P<P1 in the state, for example, shown in FIG. 2, (b) or (c), therefore, the control section 20 controls the drive motor 11 so as to rotate it counterclockwise on the basis of the detected output of its angle sensor, and drives the vibration section 23 including the link mechanism 14 to bring about the state shown in FIG. 2(a). Upon judging that P1≦P<P2, the control section 20 controls the drive motor 11 so as to rotate it to bring about the state shown in FIG. 2, (b) (referred to as drive 1). Upon judging that P2≦P, the control section 20 controls the drive motor 11 so as to rotate it to bring about the state shown in FIG. 2, (c) (referred to as drive 2).

In FIG. 7A, it is also possible to set the drive quantity of the drive 1 equal to 0 and execute the drive 2 only when P2≦P. By conducting a change of the screen display or speech guide when the pushing pressure P of the fingertip is P1≦P<P2 and conducting the drive only when P2≦P, It is also possible to make the operator certainly recognize that the determination operation has been executed, and the drive control can be simplified.

FIG. 7B shows an example in which the drive quantity is changed continuously in response to an increase of the pushing pressure. If the pushing pressure P caused by the fingertip becomes P2≦P, then a change in the drive force caused by a pressure change increases rapidly. This approximates the phenomenon that a button is pressed rapidly when a certain pressing position is exceeded in pushing a physical key. Irrespective of the use of the touch panel, touch feeling is obtained as if a physical key is pushed.

FIG. 7C shows an example in which the drive continuously increases in the pushing pressure direction in response to an increase of the pushing pressure when the pushing pressure P caused by the fingertip is P1≦P<P2, and drive is effected in a direction opposite to the pushing pressure when the pushing pressure P is P2≦P. According to this example, drive is effected in a direction completely opposite to that in the touch state, when pressing operation is conducted. Therefore, it is possible to make the user definitely recognize that the determination operation has been executed.

FIG. 8 is a flow chart showing a first concrete example of such function control conducted by the control section 20. Hereafter, processing conducted by the control section 20 when the pressure P is 0≦P<P1, processing conducted by the control section 20 when the pressure P is P1≦P<P2, and processing conducted by the control section 20 when the pressure P is P2≦P are referred to as A, B and C, respectively. The processing will be described later. As a matter of course, the processing A is processing conducted when even touch operation on the touch panel 9 is not effected.

With reference to FIG. 8, if a power supply, which is not illustrated, is turned on, the control section 20 conducts the processing A and brings the unit into an operation start state (step 100). First, the control section 20 determines whether an operation end condition is set by, for example, turning off the power supply (step 101). If the operation end condition is set, the operation ends (step 113). If the operation end condition is not set, then the control section 20 takes in detected pressure P from the pressure sensor shown in FIG. 6, and determines whether P≧P1 (step 102). When P<P1, it is judged that even touch operation on the touch panel 9 is not conducted, and the control section 20 returns to the step 100. Until touch operation is effected, a series of operations in steps 100 to 102 are repeated, and the processing A is executed during that time. A picture displayed on the display screen 2 (FIGS. 1A to 1C) by the processing A at this time is denoted by (1).

If touch operation on the touch panel 9 is effected as shown in FIG. 4, (b) or (c), then it follows that P≧P1 (this includes P≧P2) (step 102). First, therefore, the control section 20 determines whether a position (touch position) on the touch panel 9 touched by the fingertip 19 is in a position of a touch operation member, such as an operation button, where the processing B or C is to be executed as shown in FIG. 4, (b) or (c) (step 103). Here, the touch position of the fingertip 19 is detected by the touch sensor (FIG. 6). The touch position is compared with data in the storage section 22 (FIG. 6). It is thus determined whether the touch position is in the position that needs execution of the processing B or C. For example, supposing that the touch operation member is an operation button, it is determined whether the touch position is within the display area of the operation button (hereafter referred to as operation button area). If the touch position is within the operation button area on the display screen 2, then the processing B is first executed (step 104), and the drive motor 11 (FIG. 6) is controlled and the vibration section 23, i.e., the link mechanism 14 is actuated to execute the drive 1 (FIGS. 7A to 7C) for the display screen 2 (step 105). If the touch position is not in the operation button area, then execution of the processing A is continued at the step 103 so long as P≧P1. If thereafter the relation P<P1 is satisfied (the fingertip 19 is detached from the touch panel 9), then the processing returns to the step 100 although not illustrated. If the fingertip 19 moves and the touch position enters the operation button area, then the operation button area is judged to be touched and the processing B and the drive 1 are executed (steps 104 and 105). A picture displayed on the display screen 2 (FIGS. 1A to 1C) by the processing B at this time is denoted by (2).

Taking the configuration shown in FIGS. 1A to 1C as an example, the state shown in FIG. 2, (b) is brought about by execution of the drive 1, and the display screen 2 is retreated and drawn in slightly from the opening 1a of the cabinet 1. The instant an area of any of operation buttons is touched, the display screen 2 thus becomes small suddenly or gradually retreats and becomes small. Even if an area other than the operation buttons is touched, there are no changes on the display screen 2 at all. Therefore, it can be recognized by tactile sensation that an area of an operation button is touched. For example, even if the display screen 2 is watched obliquely and parallax is caused, it can be determined easily whether the operation button is touched. In addition, even a visually handicapped person can touch an operation button accurately.

And the detected pressure P is taken in from the pressure sensor to make a decision. If P<P1 (step 106), then the processing B is finished (step 107) and the control section 20 returns to the step 100. If P1≦P (step 106), then a decision is made whether P2≦P (step 108). If P1≦P<P2 as a result of this decision, the control section 20 returns to the step 103, and the processing B and the drive 1 are continued and executed so long as P1≦P<P2. If P2≦P (step 108) and the touch position is in an area of an operation button, then the processing C is executed (step 109) and the drive 2 (FIGS. 7A to 7C) is executed (step 110). A picture displayed on the display screen 2 (FIGS. 1A to 1C) by the processing C at this time is denoted by (3).

With respect to the operation buttons, the processing C corresponds to, for example, the determination processing in the first embodiment. The drive 2 executed simultaneously at this time further presses the display screen 2 greatly with a bang. If execution operation is conducted by using an operation button displayed on the display screen 2, therefore, the display screen 2 is pressed simultaneously. Therefore, the user can feel as if a switch having a hardware configuration is pressed. Even if the determination operation of the operation button is conducted with large parallax, it can be determined accurately whether such operation has been conducted. In addition, even a visually handicapped person can know certainly that the determination operation has been executed, owing to the execution of the drive 2 subsequent to the execution of the drive 1.

As for the drive 2, the display screen may be moved in such a direction as to move it to the original position (in a direction opposite to the pushing pressure direction caused by the fingertip) as shown in FIG. 7C. If the travel in the drive 2 is travel that is discontinuous from the drive 1, then it can be recognized with the finger that the display screen 2 is pressed, and it can be known certainly that the determination operation has been executed.

If the processing C and the drive 2 are executed and then the fingertip 19 is detached from the touch panel 9, then the relation P<P2 is satisfied (step 111), and consequently the processing C is finished (step 112) and the control section 20 returns to the step 103. If at this time P<P1, then the control section 20 returns to the step 100.

If the fingertip 19 touches the operation button area on the touch panel 9 as shown in FIG. 4(b) and the relation P1≦P<P2 is satisfied, then the processing B and the drive 1 are conducted. If the fingertip 19 touches the touch panel 9 so as to press the operation button as shown in FIG. 4, (c), then the relation P2≦P is satisfied, and the processing C and the drive 2 are executed via the execution of the processing B.

Concrete examples of a picture on the display screen 2 obtained by such operation will now be described.

Figure 9A:
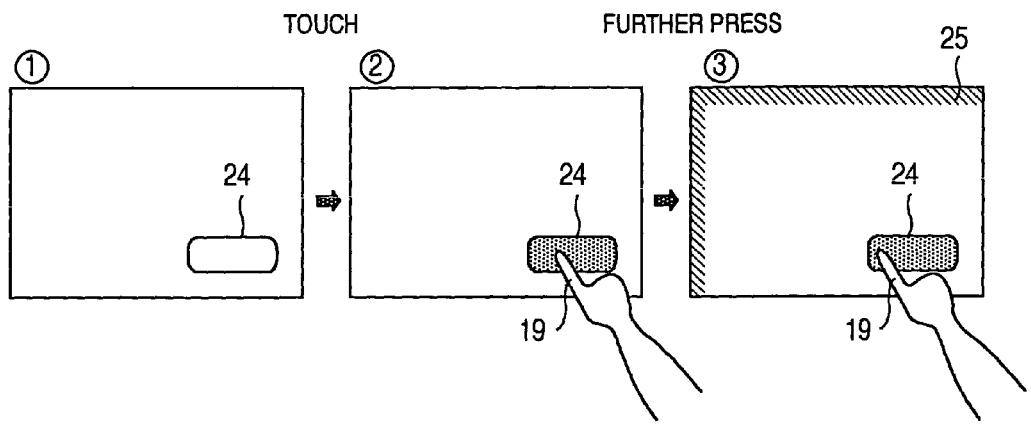
FIGS. 9A, 9B and 9C are diagrams showing concrete examples of a screen displayed on a display screen shown in FIGS. 1A to 1C in operation shown in FIG. 8.
Figure 9B:
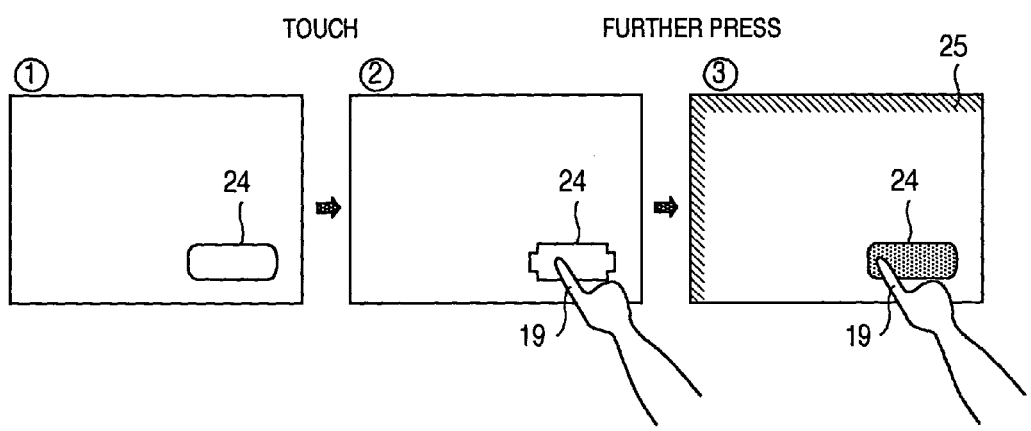
Figure 9C:
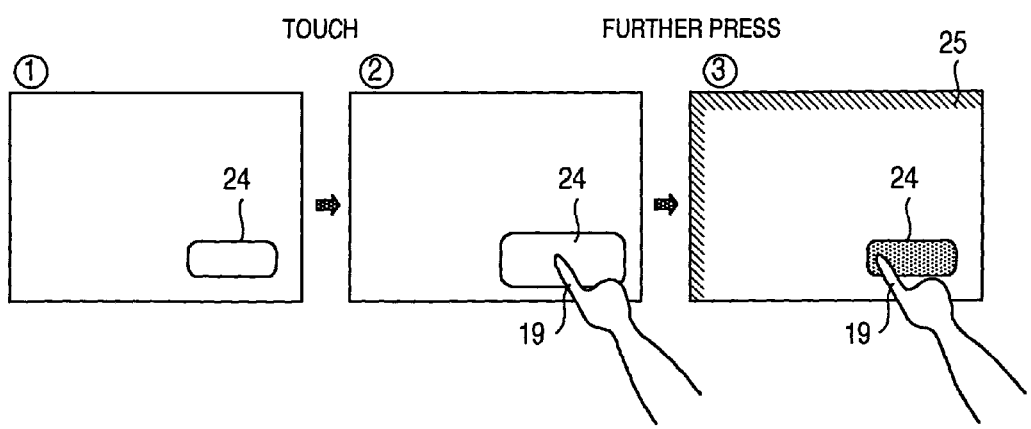

FIGS. 9A, 9B and 9C are diagrams showing concrete examples of such a picture supposing that the touch operation members are operation buttons.

FIG. 9A shows a concrete example in which an operation button 24 is displayed on the display screen 2 and the display color is changed according to the processing A, B and C by touching the operation button 24. In the operation at the steps 100 to 102 in FIG. 8, the processing A is conducted and a picture (1) is displayed. It is now supposed that the operation button 24 is displayed with a first color in the picture (1).

In such a display state, an area of the operation button 24 is touched by the fingertip 19. If the pressure P applied to the touch panel 9 at this time is P1≦P<P2 (the step 102 in FIG. 8), the touch position of the fingertip 19 is detected by the touch sensor (FIG. 6) at this time. If the touch position is judged to be in the area of the operation button 24 (i.e., if the touch position is judged to coincide with the operation button position) on the basis of data in the storage section 22 (FIG. 6) (the step 103), then the processing B is executed (the step 104 in FIG. 8) and a picture (2) with the operation button 24 changed to a second color is displayed. Together therewith, the drive 1 shown in FIGS. 7A to 7C is executed (the step 105 in FIG. 8), and a transition from the state shown in FIG. 2, (a) to the state shown in FIG. 2, (b) is effected to make the display screen 2 small suddenly or make the display screen 2 small gradually and retreat into the interior. Owing to the processing B and the drive 1 heretofore described, it can be recognized visually and tactually that the fingertip 19 has touched the operation button 24.

In addition, the fingertip 19 presses the operation button 24. As a result, the relation P2≦P is satisfied. If in this case as well the touch position coincides with the position of the operation button 24, then a picture (3) with the operation button 24 changed to a third color is displayed. Together therewith, the drive 2 shown in FIGS. 7A to 7C is executed, and a transition from the state shown in FIG. 2, (b) to the state shown in FIG. 2, (c) is rapidly effected to make the display screen 2 retreat greatly into the interior with a bang. (By the way, in the case of FIG. 7C, the display screen advances, to the contrary.) Owing to this, it can be recognized visually and tactually that a function operation such as an execution operation has been conducted with the operation button 24 (i.e., that the operation button 24 has been operated without fail). When false operation has been conducted, therefore, it can be easily known and the re-touch operation can be conducted easily, resulting in improved false operation prevention. If the fingertip 19 is detached from the touch panel 9, then the picture returns to the picture (1).

FIG. 9B shows a concrete example in which the shape of the operation button 24 is changed according to the processing A, B and C by touching the operation button 24 on the display screen 2. In this concrete example as well, the processing A is conducted and a picture (1) is displayed in the operation of steps 100 to 102 in FIG. 8. It is supposed that in the picture (1), for example, the operation button 24 is displayed in a rectangular shape.

In such a display state, the position (area) of the operation button 24 is touched by the fingertip 19. If the pressure P applied to the touch panel 9 at this time is P1≦P<P2 (the step 102 in FIG. 8), the touch position of the fingertip 19 is detected by the touch sensor (FIG. 6) at this time. If the touch position is judged to coincide with the position of the operation button 24 on the basis of data in the storage section 22 (FIG. 6) (the step 103 in FIG. 8), then the processing B is executed (the step 104 in FIG. 8) and a picture (2) with the operation button 24 changed in shape from the rectangle to another shape is displayed. Together therewith, the drive 1 shown in FIGS. 7A to 7C is executed (the step 105 in FIG. 8), and a transition from the state shown in FIG. 2, (a) to the state shown in FIG. 2, (b) is effected to make the display screen 2 small suddenly or make the display screen 2 small gradually and retreat into the interior. Owing to the processing B and the drive 1 heretofore described, it can be recognized visually and tactually that the fingertip 19 has touched the operation button 24.

In addition, the fingertip 19 presses the operation button 24. As a result, the relation P2≦P is satisfied. If in this case as well the touch position coincides with the position of the operation button 24, then a picture (3) with the operation button 24 changed to a third shape (which may be the original shape in the picture (1)) is displayed. In this case, the color of the operation button 24 may also be changed.

Together therewith, the drive 2 shown in FIGS. 7A to 7C is executed, and a transition from the state shown in FIG. 2, (b) to the state shown in FIG. 2, (c) is rapidly effected to make the display screen 2 retreat greatly into the interior with a bang. (By the way, in the case of FIG. 7C, the display screen advances, to the contrary.) Owing to this, it can be recognized visually and tactually that a function operation such as an execution operation has been conducted with the operation button 24 (i.e., that the operation button 24 has been operated without fail). Effects similar to those described above are obtained. If the fingertip 19 is detached from the touch panel 9, then the picture returns to the picture (1).

FIG. 9C shows a concrete example in which the size of the operation button 24 is changed according to the processing A, B and C by touching the operation button 24 on the display screen 2. In this concrete example as well, the processing A is conducted and a picture (1) is displayed in the operation of steps 100 to 102 in FIG. 8. It is supposed that on the picture (1), for example, the operation button 24 is displayed in a rectangular shape.

In such a display state, the position (area) of the operation button 24 is touched by the fingertip 19. If the pressure P applied to the touch panel 9 at this time is $P1 \leq P < P2$ (the step 102 in FIG. 8), the touch position of the fingertip 19 is detected by the touch sensor (FIG. 6) at this time. If the touch position is judged to coincide with the position of the operation button 24 on the basis of data in the storage section 22 (FIG. 6) (the step 103 in FIG. 8), then the processing B is executed (the step 104 in FIG. 8) and a picture (2) with the operation button 24 changed, for example, greatly in size is displayed. Together therewith, the drive 1 shown in FIGS. 7A to 7C is executed (the step 105 in FIG. 8), and a transition from the state shown in FIG. 2(*a*) to the state shown in FIG. 2(*b*) is effected to make the display screen 2 small suddenly or make the display screen 2 small gradually and retreat into the interior. Owing to the processing B and the drive 1 heretofore described, it can be recognized visually and tactually that the fingertip 19 has touched the operation button 24.

In addition, the fingertip 19 presses the operation button 24. As a result, the relation $P2 \leq P$ is satisfied. If in this case as well the touch position coincides with the position of the operation button 24, then a picture (3) with the operation button 24 changed from the former size (which may be the original size in the picture (1)) is displayed. In this case, the color of the operation button 24 may also be changed. Together therewith, the drive 2 shown in FIGS. 7A to 7C is executed, and a transition from the state shown in FIG. 2, (b) to the state shown in FIG. 2, (c) is rapidly effected to make the display screen 2 retreat greatly into the interior with a bang. (In the case of FIG. 7C, however, the display screen advances, to the contrary.) Owing to this, it can be recognized visually and tactually that a function operation such as an execution operation has been conducted with the operation button 24 (i.e., that the operation button 24 has been operated without fail). Effects similar to those described above are obtained. If the fingertip 19 is detached from the touch panel 9, then the picture returns to the picture (1).

By the way, in the processing concerning the operation of the operation button heretofore described, the processing B can be assigned to selection processing of an operation button, and the processing C can be assigned to the determination processing for determining the function selected by the operation button.

In FIGS. 9A to 9C, two adjacent sides of the picture (3) may be provided with a shadow 25 to visually represent that the picture (3) is pushed and retreated.

Figure 10A:
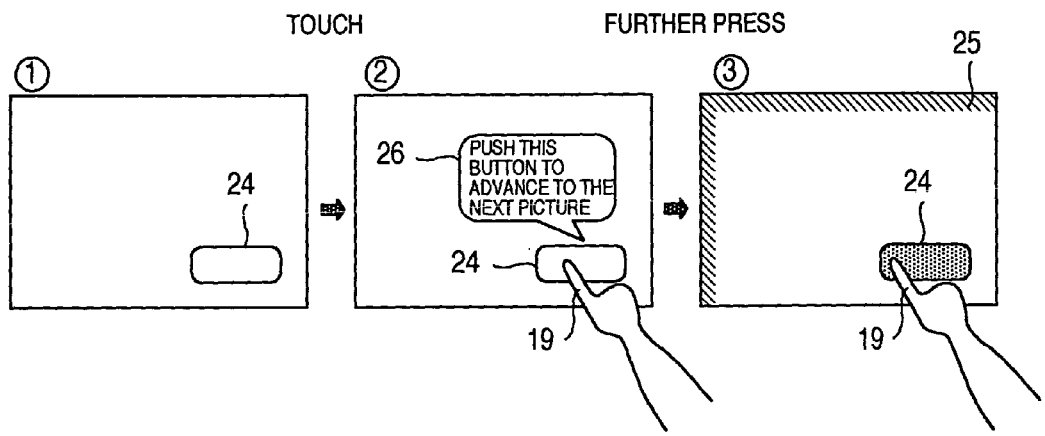
FIGS. 10A, 10B and 10C are diagrams showing other concrete examples of a screen displayed on a display screen shown in FIGS. 1A to 1C in operation shown in FIG. 8.
Figure 10B:
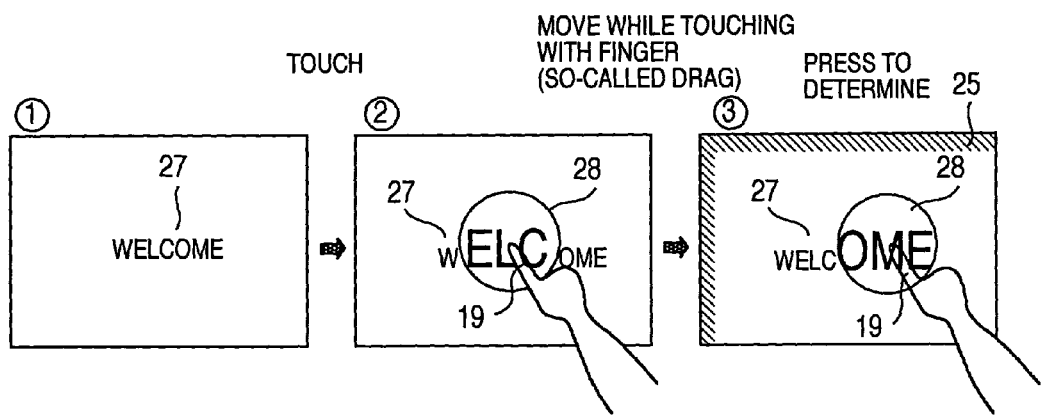
Figure 10C:
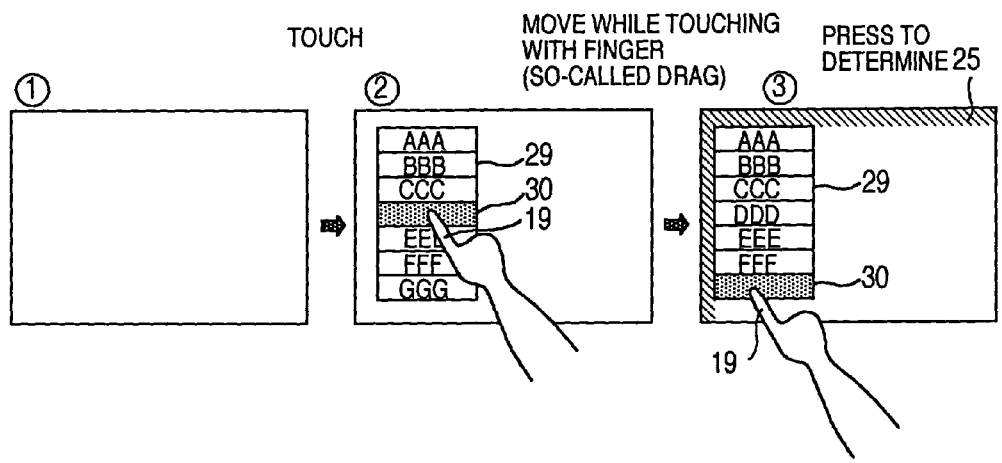

FIGS. 10A, 10B and 10C are diagrams showing other concrete examples of the picture on the display screen 2 obtained by the operation shown in FIG. 8.

In FIG. 10A, a touch button is used as the touch operation member, and a function similar to the mouse over function in personal computers is provided.

FIG. 10A shows a concrete example in which the operation button 24 is displayed on the display screen 2 and additional information is displayed by touching the operation button 24. It is supposed that the processing A is conducted and a picture (1) including the operation button 24 is displayed in the operation of steps 100 to 102 in FIG. 8.

In such a display state, the area of the operation button 24 is touched by the fingertip 19. If the pressure P applied to the touch panel 9 at this time is $P1 \leq P < P2$ (the step 102 in FIG. 8), the touch position of the fingertip 19 is detected by the touch sensor (FIG. 6) at this time. If the touch position is judged to coincide with the position of the operation button 24 on the basis of data in the storage section 22 (FIG. 6) (the step 103 in FIG. 8), then the processing B is executed (the step 104 in FIG. 8) and a picture (2) including a balloon 26 that represents a guide message (i.e., a function of the operation button 24), such as, for example, "Push this button to advance to the next picture" is displayed. Together therewith, the drive 1 shown in FIGS. 7A to 7C is executed (the step 105 in FIG. 8), and a transition from the state shown in FIG. 2(*a*) to the state shown in FIG. 2, (b) is effected to make the display screen 2 small suddenly or make the display screen 2 small gradually and retreat into the interior. Owing to the processing B and the drive 1 heretofore described, it can be recognized visually and tactually that the fingertip 19 has touched the operation button 24.

Subsequently, the fingertip 19 further presses the operation button 24. As a result, the relation $P2 \leq P$ is satisfied. If in this case as well the touch position coincides with the position of the operation button 24, then a picture (3) with the operation button 24 changed in, for example, color is displayed. Together therewith, the drive 2 shown in FIGS. 7A to 7C is executed, and a transition from the state shown in FIG. 2, (b) to the state shown in FIG. 2, (c) is rapidly effected to make the display screen 2 retreat greatly into the interior with a bang. (In the case of FIG. 7C, however, the display screen advances, to the contrary.) Owing to this, it can be recognized visually and tactually that a function operation such as an execution operation has been conducted with the operation button 24 (i.e., that the operation button 24 has been operated without fail). Effects similar to those described above are obtained. If the fingertip 19 is detached from the touch panel 9, then the picture returns to the picture (1).

In this concrete example as well, the processing B can be assigned to selection processing of an operation button, and the processing C can be assigned to the determination processing for determining the function according to the operation button.

Two adjacent sides of the picture (3) may be provided with a shadow 25 to visually represent that the picture (3) is pushed and retreated.

The function heretofore described corresponds to so-called "mouse over," which gives a change to a display element by moving a mouse of a personal computer and making the mouse coincide with the display element. In this embodiment, such a mouse over function is made possible in the display unit with touch panel by discriminating the state caused by touching and represented as $P1 \leq P < P2$ from the state caused by pressing the touch panel and represented as P2≦P, and conducting the processing B and the processing C respectively for the states.

Although the function of the operation button 24 has been described with reference to the balloon 26, a voice message may be output from the speaker 21 (FIG. 6) or the message and the balloon 26 may be combined.

FIG. 10B shows a concrete example in which the touch operation member is a message and touching a part in a display area of the message displayed on the display screen 2 causes the part to be expanded and displayed.

In this concrete example as well, the processing A is conducted and a picture (1) is displayed in the operation of steps 100 to 102 in FIG. 8. It is supposed that a guide message 27, such as, for example, "welcome." is displayed in the picture (1).

In such a display state, the display area of the guide message 27 is touched by the fingertip 19. If the pressure P applied to the touch panel 9 at this time is P1≦P<P2 (the step 102 in FIG. 8), the touch position of the fingertip 19 is detected by the touch sensor (FIG. 6) at this time. If the touch position is judged to coincide with the display area of the guide message 27 on the basis of data in the storage section 22 (FIG. 6), then the processing B is executed (the step 104 in FIG. 8) and a predetermined region around the touch position of the fingertip 19 is expanded to an expanded display region 28 including the predetermined region and displayed. Therefore, a part of the guide message 27 can be expanded and displayed. By moving the fingertip 19 along the guide message 27 as the same touch state, the expanded display region 28 can be moved (dragged). By thus conducting the drag, therefore, the guide message 27 can be expanded and watched as if a composition is read with a magnifying glass. Together therewith, the drive 1 shown in FIGS. 7A to 7C is executed (the step 105 in FIG. 8), and a transition from the state shown in FIG. 2(*a*) to the state shown in FIG. 2, (b) is effected to make the display screen 2 small suddenly or make the display screen 2 small gradually and retreat into the interior. Owing to the processing B and the drive 1 heretofore described, it can be recognized visually and tactually that the fingertip 19 has touched the operation button 24.

Subsequently, the fingertip 19 further presses the display area of the guide message 27. As a result, the relation P2≦P is satisfied. If in this case as well it is judged that the touch position coincides with the display area of the guide message 27, then the processing C such as "determination" processing is conducted and a picture (3) is displayed. If this determination processing is finished, subsequent processing is started. Together therewith, the drive 2 shown in FIGS. 7A to 7C is executed, and a transition from the state shown in FIG. 2, (b) to the state shown in FIG. 2, (c) is rapidly effected to make the display screen 2 retreat greatly into the interior with a bang. (In the case of FIG. 7C, however, the display screen advances, to the contrary.) Owing to this, it can be recognized visually and tactually that a function operation for the guide message 27 has been conducted (i.e., that the display area of the guide message 27 has been touched without fail). Effects similar to those described above are obtained. At this time, two adjacent sides of the picture (3) may be provided with a shadow 25 to visually represent that the picture (3) is pushed and retreated. If the fingertip 19 is detached from the touch panel 9, then the picture returns to the picture (1).

FIG. 10C shows a concrete example in which the touch operation member includes a menu picture and a cursor and touching the touch panel 9 on the display screen 2 causes a menu column to be displayed and makes it possible for the user to select and determine a desired menu.

In this concrete example as well, the processing A is conducted and a picture (1) is displayed in the operation of steps 100 to 102 in FIG. 8. It is supposed that anything other than a background pattern (not illustrated) is not displayed in the picture (1).

An arbitrary position in such a picture (1) is touched by the fingertip 19. If the detected pressure P applied to the touch panel 9 at this time is P1≦P<P2 (the step 102 in FIG. 8), the touch position of the fingertip 19 is detected by the touch sensor (FIG. 6) at this time. If the touch position is judged to be a position in the picture (1) on the basis of data in the storage section 22 (FIG. 6), then the processing B is executed (the step 104 in FIG. 8) and a picture (2) having a menu column 29, which includes a plurality of menus, is displayed. Together therewith, the drive 1 shown in FIGS. 7A to 7C is executed (the step 105 in FIG. 8), and a transition from the state shown in FIG. 2, (a) to the state shown in FIG. 2, (b) is effected to make the display screen 2 small suddenly or make the display screen 2 small gradually and retreat into the interior. Owing to the processing B and the drive 1 heretofore described, it can be recognized visually and tactually that the fingertip 19 has touched a position in the picture (1).

By the processing B, a cursor 30 is also displayed on a menu including the touch position of the fingertip 19 in the menu column 29 in the picture (2). If the fingertip 19 is moved while maintaining the same touch state, then the cursor 30 also sticks to the fingertip 19 and drags, and a desired menu can be selected. After the cursor 30 is squared with a desired menu (at this time, the touch position of the fingertip 19 also coincides with the desired menu), the fingertip 19 further presses the menu. As a result, the relation P2≦P is satisfied (the step 108). If in this case as well it is judged that the touch position coincides with the position of the menu, then the processing C is executed (the step 109) and a picture (3) for determining the desired menu is displayed. In this case, the color of the cursor 30 may also be changed. Together therewith, the drive 2 shown in FIGS. 7A to 7C is executed, and a transition from the state shown in FIG. 2, (b) to the state shown in FIG. 2, (c) is rapidly effected to make the display screen 2 retreat greatly into the interior with a bang. (In the case of FIG. 7C, however, the display screen advances, to the contrary.) Owing to this, it can be recognized visually and tactually that a function operation for the guide message 27 has been conducted (i.e., that the display area of the guide message 27 has been touched without fail). Effects similar to those described above are obtained. At this time, two adjacent sides of the picture (3) may be provided with a shadow 25 to visually represent that the picture (3) is pushed and retreated. If the fingertip 19 is detached from the touch panel 9, then the picture returns to the picture (1).

In this way, the concrete examples shown in FIGS. 10B and 10C have a function of drag and determination using a mouse in which a point, such as the expanded display region 28 or the cursor 30, is moved and determination is conducted in a selected position.

In the first concrete example described above, the pressing pressure (=P2) for causing the processing to be executed may be made different according to the kind of the touch operation member (such as the operation button 24, the guide message 27, or the cursor 29). For example, an operation button 24 that care must be taken in operating, such as a "delete" button, can be prevented from functioning (i.e., executing the processing C) unless pushed strongly as compared with other touch operation members. As a result, the operation button 24 is hard to function, even if it is pressed by mistake.

Figure 11A:
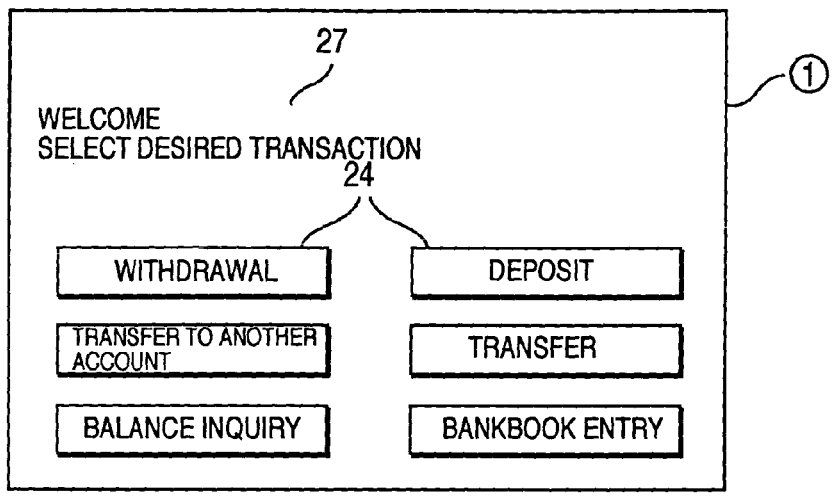
FIGS. 11A, 11B and 11C are diagrams showing screens when a first embodiment of the present invention is used as a display unit for an ATM and screen examples shown in FIGS. 9A to 9C and 10A to 10C are used.
Figure 11B:
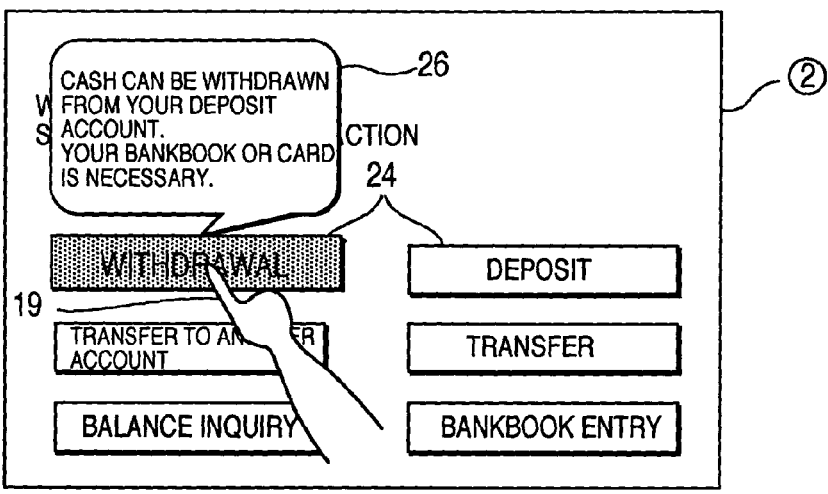
Figure 11C:
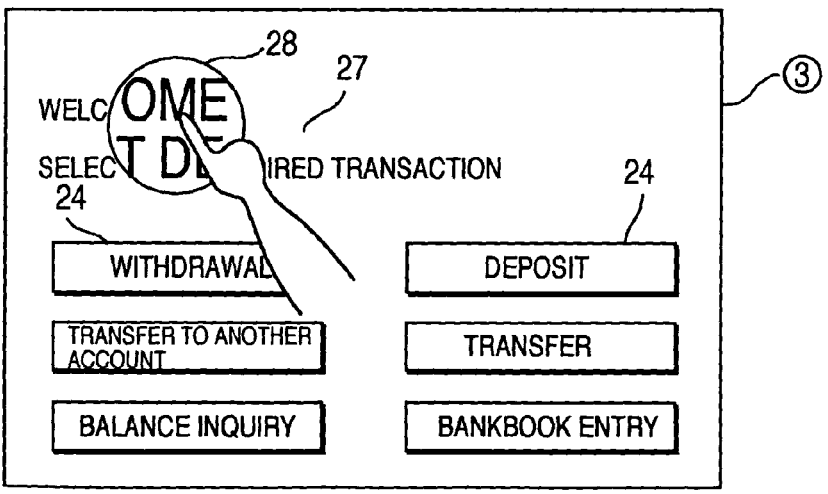

FIGS. 11A, 11B and 11C are diagrams showing pictures used when a display unit with touch panel according to the present invention is used as a display unit for an ATM (Automatic Tellers Machine) and the first concrete example described above is used for the display unit. Components corresponding to those in the preceding drawings are denoted by like characters. Here, picture changes shown in FIGS. 9A and 9C and FIGS. 10A and 10B are used.

It is now supposed that an initial picture (1) shown in FIG. 11A is displayed on the display screen 2 having the configuration shown in FIG. 3B in the ATM having the circuit configuration as shown in FIG. 6 (the step 100 in FIG. 8). On this initial picture (1), selection buttons 24 for selecting an act performed for the bank by the customer, such as a "withdrawal" button and a "deposit" button, and a guide message 27 for the customer are displayed. If the customer touches the "withdrawal" button 24 lightly with the fingertip 19 in order to withdraw a deposit and the control section 20 (FIG. 6) judges the detected pressure P to be P1≦P (the steps 102 and 103 in FIG. 8, then a guide picture (2) as shown in FIG. 11B is displayed on the display screen of the ATM (the step 104 in FIG. 8). In this guide picture (2), the "withdrawal" button 24 touched by the fingertip 19 is expanded as in the picture (2) shown in FIG. 9C and displayed with a color changed as in the picture (2) shown in FIG. 9A. In addition, a guide in the case where the deposit is withdrawn, such as "Cash can be withdrawn from your deposit account. Your bankbook or cash card is necessary" is displayed as a balloon 26 from the "withdrawal" button 24 as in the picture (2) shown in FIG. 10A. In this case, this guide may be output from a speaker, which is not illustrated, as a speech. In this case, the drive 1 shown in FIGS. 7A to 7C is executed (the step 105 in FIG. 8).

If the "withdrawal" button 24 in the guide picture (2) is pressed by the fingertip 19 and the detected pressure P becomes P2<P (the step 108 in FIG. 8), then the selection of the "withdrawal" button 24 is determined, and operation for withdrawing the deposit can be conducted in the next picture, which is not shown (the step 109 in FIG. 8). In this case, the drive 2 shown in FIGS. 7A to 7C is executed (the step 110 in FIG. 8).

If in the initial picture (1) shown in FIG. 11A a display portion of the guide message 27 is touched by the fingertip 19 so that the detected pressure P may become P1≦P, then it is also possible to display the expanded display region 28 as in the picture (2) shown in FIG. 10B and display a guide picture (3) shown in FIG. 1C, in which a part of predetermined range including the touch position is expanded and displayed in the expanded display region 28. If in this case the fingertip 19 is moved along the guide message 27 in such a touch state, then characters in a series of character string in the guide message 27 are expanded in order. As a result, the guide message 27 can be expanded and watched.

FIGS. 12A, 12B and 12C are diagrams showing pictures obtained when a display unit with touch panel according to the present invention is used as a display unit in a ticket machine and the first concrete example is used therein. Components corresponding to those in the preceding drawings are denoted by like characters. It is now supposed that picture changes shown in FIG. 10B are used.

It is now supposed that an initial picture (1) shown in FIG. 12A is displayed on the display screen 2 of a ticket machine having a configuration shown in FIGS. 1A to 1C or FIG. 2. In the initial picture (1), a route and principal stations are displayed and stations other than them are not displayed (the step 100 in FIG. 8).

It is now supposed that a customer purchases a ticket to a desired station. (Of course, a configuration in which a special express ticket or a reserved seat ticket can be purchased may be adopted.) When the desired station is displayed in the initial picture (1), a display position of the desired station is pushed hard by the fingertip 19. As a result, the steps 102 to 106 and 108 in FIG. 8 are conducted, and a picture for purchase (3) as shown in FIG. 12C is displayed. As a result, the customer can know the fare immediately and purchase a ticket (the step 109 in FIG. 8). In this case, it is a matter of course that a configuration in which other tickets, such as a special express ticket or a reserved seat ticket, can be purchased may also be adopted.

When a station desired by the customer is not displayed in the initial picture (1), the customer touches a displayed route with a fingertip. If the control section judges the touch to be P1<P (the step 102 in FIG. 8) and the touch position is not displayed, but it coincides with a hidden station display position (step 103 in FIG. 8), then the control section senses it and causes the guide picture (2) as shown in FIG. 12B to be displayed (the step 104 in FIG. 8). In this guide picture (2), an expanded display region 28 is provided in the touch position of the fingertip 19 as shown in the pictures (2) and (3) in FIG. 10B, and the existence of a station is displayed in an expanded form by using, for example, a name of the station in the expanded display region 28. If the station displayed in the expanded form is a station that is not desired by the customer, then the customer moves the fingertip along the route. Each time the touch position of the fingertip 19 coincides with a position of a station, therefore, an expanded display region 28 with an expanded name of the station is displayed. Thus, the customer can search for the desired station. If the desired station is found and the customer presses the portion of the station name with the fingertip 19 (in this case, the drive 2 is executed), then the selection of the station is determined and the picture (3) for purchase as shown in FIG. 12C is displayed (the step 109 in FIG. 8). Thus the customer can purchase a ticket to the desired station.

Thus, in the ticket selling machine, routes in a wide range section can be simultaneously displayed on the display screen. A ticket to a station that is not displayed can also be purchased with simple operation.

The ticket machine has been described by taking a railroad as an example. However, it is a matter of course that the routes may be bus routes, ship routes, or air routes.

In the guide picture (2) shown in FIG. 12B, routes in the whole range for which tickets are sold may be displayed simultaneously. In an alternative approach, a part of the range is displayed, and if the fingertip 19 reaches an end of the picture (2), the display is switched to a subsequent part. As a matter of course, in this case, the touch position in a previously displayed route is made clear in a newly displayed route. As a result, the range for which tickets are sold can be extended.

A second embodiment of the display unit with touch panel according to the present invention will now be described. In the second embodiment as well, however, a configuration similar to that in the first embodiment shown in FIGS. 1A to 6 is used, and operations shown in FIGS. 7A to 8 are conducted.

Figure 13:
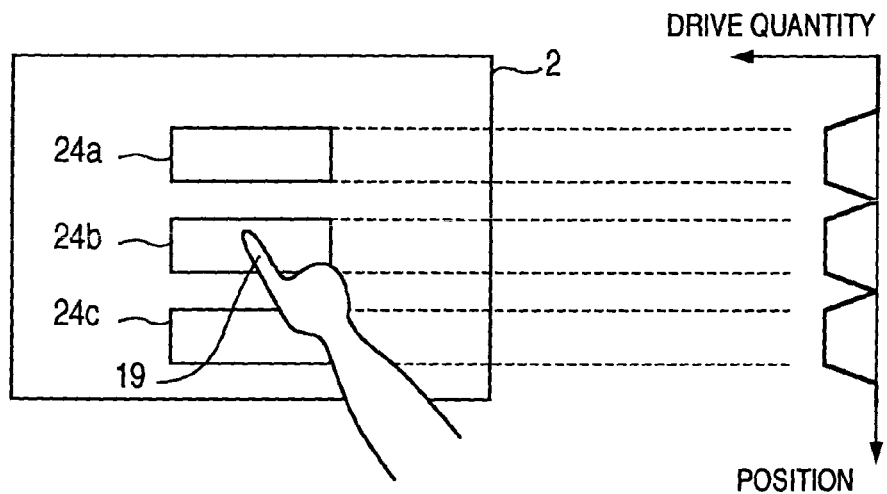
FIG. 13 is a diagram showing a display screen in a second embodiment of a display unit with touch panel according to the present invention.

FIG. 13 is a diagram showing a concrete example of a picture displayed on the display screen 2 in the second embodiment by the control operation shown in FIG. 8.

With reference to FIG. 13, it is now supposed that operation buttons 24a to 24c are displayed on the display screen 2 and the fingertip 19 has touched the display screen 2. If the pressure P caused by the touch of the fingertip 19 and detected by the pressure sensor (FIG. 6) becomes $P1 \leq P$ (the step 102), then the control section 20 detects the touch position of the fingertip 19 on the basis of a result detected by the touch sensor (FIG. 6), compares the touch position with data in the storage section 22 (FIG. 6), and thereby determines whether the touch position is in an area (here, in an area of one of the operation buttons 24a to 24c) where a predetermined function (i.e., the processing B and C) is to be executed (the step 103). If the touch position is, for example, in the area of the operation button 24b, then the control section 20 first executes the processing B (the step 104), controls the drive motor 11 (FIG. 6) to activate the vibration section 23, i.e., the link mechanism 14, and executes the drive 1 shown in FIGS. 7A to 7C (the step 105). If the touch position is in neither of the areas of the operation buttons 24a to 24c, i.e., none of the operation buttons 24a to 24c is touched, then execution of the processing A is continued at the step 103 so long as $P \geq P1$. If thereafter the relation $P<P1$ is satisfied (i.e., the fingertip 19 is detached from the touch panel 9), then the control section 20 returns to the step 100 although not illustrated. If the fingertip 19 moves and comes in an area of any of the operation buttons 24a to 24c, then the control section 20 regards the operation button touched, and executes the processing B (the step 104), controls the drive motor 11 (FIG. 6) to activate the vibration section 23, i.e., the link mechanism 14, and executes the drive 1 shown in FIGS. 7A to 7C (the step 105).

Taking the configuration shown in FIGS. 1A to 1C as an example, the state shown in FIG. 2, (b) is brought about by execution of the drive 1, and the display screen 2 is retreated and drawn in slightly from the opening 1a of the cabinet 1. The instant an area of any of the operation buttons 24a to 24c is touched, the display screen 2 thus becomes small suddenly or gradually retreats and becomes small. Even if an area other than the operation buttons 24a to 24c is touched, there are no changes on the display screen 2 at all. Therefore, it can be recognized by tactile sensation that an area of one of the operation buttons 24a to 24c is touched. For example, even if the display screen 2 is watched obliquely and parallax is caused, it can be determined easily whether the operation button is touched. In addition, even a visually handicapped person can touch an operation button accurately.

In this concrete example, the processing B is not always necessary. It is sufficient that at least the drive 1 is executed.

And the detected pressure P is taken in from the pressure sensor to make a decision. If $P<P1$ (the step 106), then the processing B is finished (the step 107) and the control section 20 returns to the step 100. If $P1 \leq P$ (the step 106), then a decision is made whether $P2 \leq P$ (the step 108). If $P1 \leq P<P2$ as a result of this decision, the control section 20 returns to the step 103, and the processing B and the drive 1 are continued and executed so long as $P1 \leq P<P2$. If $P2 \leq P$ (the step 108) and the touch position is in an area of any of operation buttons 24a to 24c, then the processing C is executed (the step 109) and the drive 2 shown in FIGS. 7A to 7C is executed (the step 110).

With respect to the operation buttons 24a to 24c, the processing C corresponds to the determination processing in the same way as the preceding concrete examples. The drive 2 executed simultaneously at this time further presses the display screen 2 greatly with a bang. If execution operation is conducted by using the operation buttons 24a to 24c displayed on the display screen 2, therefore, the display screen 2 is pressed simultaneously. Therefore, the customer can feel as if a switch having a hardware configuration is pressed. Even if the determination operation of the operation button is conducted with large parallax, it can be determined accurately whether such operation has been conducted. In addition, even a visually handicapped person can know certainly that the determination operation has been executed, owing to the execution of the drive 2 (the retreat or advance of the display screen 2) subsequent to the execution of the drive 1.

If the fingertip 19 is detached from the touch panel 9 during the execution of the processing C and the drive 2, then the relation $P<P2$ is satisfied (the step 111), and consequently the processing C is finished (the step 112) and the control section 20 returns to the step 103. If at this time $P<P1$, then the control section 20 returns to the step 100. The processing C is processing similar to the processing C in the preceding concrete examples. In this concrete example, however, the processing C is not always necessary. It is sufficient that at least the drive 2 is executed.

As an application example of this concrete example, the case where this concrete example is applied to an ATM will now be described with reference to FIGS. 14A and 14B.

Figure 14A:
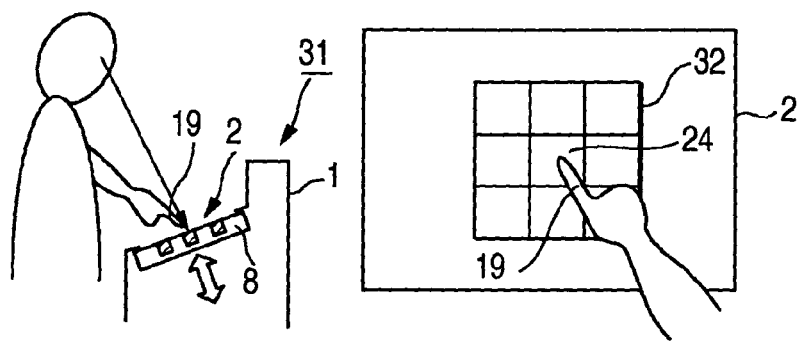
FIGS. 14A and 14B are diagrams showing a concrete example of operation and a screen in an ATM using a second embodiment of the present invention.
Figure 14B:
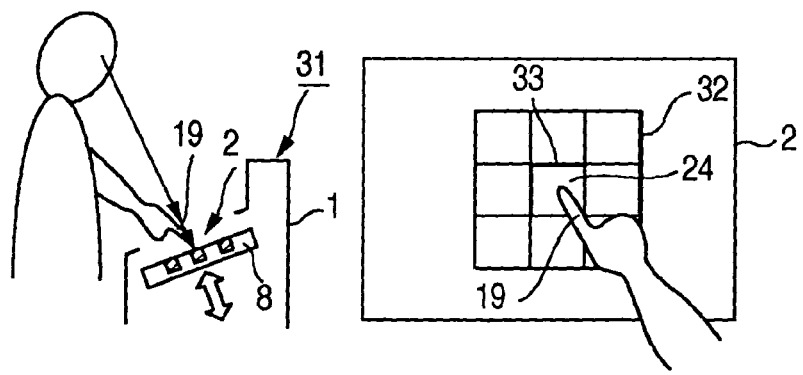

In FIG. 14A, one desired operation button 24 included in a button group formed of a plurality of operation buttons 24 on the display screen 2 of display panel 8 of an ATM 31 is touched by the fingertip 19, and the detected pressure P is $P1<P<P2$. By displaying a shadow 32 on the contour of the button group, the button group is displayed so as to look floating. In this case, the processing B of, for example, changing the color of the operation button 24 touched by the fingertip 19 on the display screen 2 is executed at the step 104 shown in FIG. 8, and the drive 1 in FIGS. 7A to 7C of sinking the display screen 2 into the rear at the opening of the cabinet 1 of the ATM 31 is executed at the step 105 shown in FIG. 8.

In addition, the operation of pressing the operation button 24 is conducted for the determination operation. If the relation $P2 \leq P$ is satisfied, then the processing C of providing two sides of the operated operation button 24 with a shadow 33 so that the operation button 24 will look pressed as shown in FIG. 14B is executed at the step 109 shown in FIG. 8, and the drive 2 in FIGS. 7A to 7C of sinking the display screen 2 into the rear or lifting the display screen 2 at the opening of the cabinet 1 of the ATM 31 is executed at the step 110 shown in FIG. 8.

When the operation button 24 displayed on the plain display screen 2 is subject to the touch operation, the customer feels in the same way as when the customer operates a hardware button and the customer recognizes visually as if the operation button is pressed, as a result of the execution of the drives 1 and 2. Favorable feeling of operation is thus obtained. Furthermore, by making the width and depth of the shadow 33 correspond to the travel quantity of the display screen, further favorable feeling of operation is obtained.

As another application example of the concrete example, the case where the concrete example is also applied to an ATM will now be described with reference to FIGS. 15A and 15B.

Figure 15A:
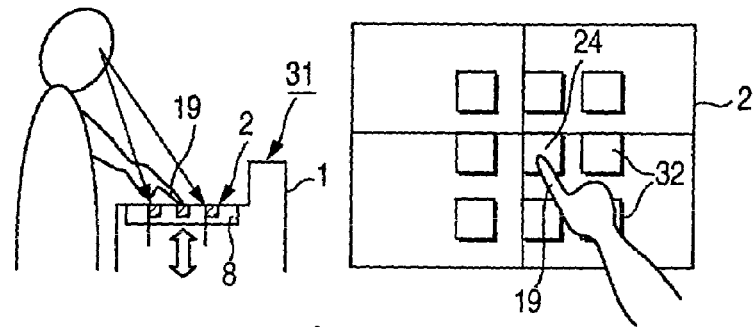
FIGS. 15A and 15B are diagrams showing another concrete example of operation and a screen in an ATM using a second embodiment of the present invention.
Figure 15B:
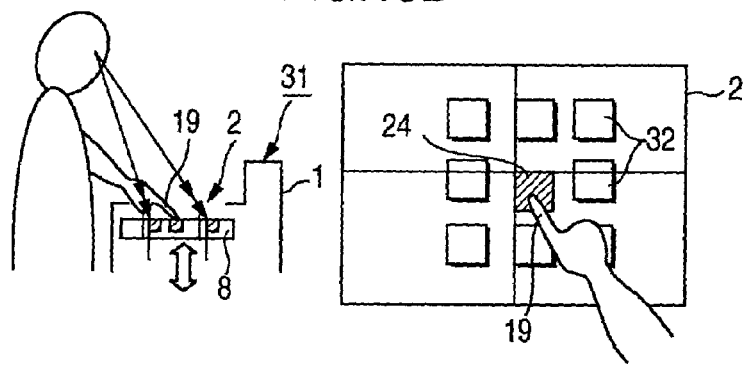

In FIG. 15A, one desired operation button 24 included in a button group formed of a plurality of separate operation buttons 24 on the display screen 2 of display panel 8 of an ATM 31 is touched by the fingertip 19, and the detected pressure P is $P1<P<P2$. By displaying a shadow 32 on the contour of each of the operation buttons 24, the operation buttons are displayed so as to look floating. In this case, the processing B of, for example, changing the color of the operation button 24 touched by the fingertip 19 on the display screen 2 is executed at the step 104 shown in FIG. 8, and the drive 1 in FIGS. 7A to 7C of sinking the display screen 2 into the rear at the opening of the cabinet 1 of the ATM 31 is executed at the step 105 shown in FIG. 8.

In addition, the operation of pressing the operation button 24 is conducted for the determination operation. If the relation P2≦P is satisfied, then the processing C of removing the shadow for the operated operation button 24 so that the operation button 24 will look pressed as shown in FIG. 15B is executed at the step 109 shown in FIG. 8, and the drive 2 in FIGS. 7A to 7C of sinking the display screen 2 into the rear or lifting the display screen 2 at the opening of the cabinet 1 of the ATM 31 is executed at the step 110 shown in FIG. 8.

When the operation button 24 displayed on the plain display screen 2 is subject to the touch operation, the customer feels in the same way as when the customer operates a hardware button and the customer recognizes visually as if the operation button is pressed, as a result of the execution of the drives 1 and 2. In this application example as well, favorable feeling of operation is thus obtained in the same way as the preceding application example.

Furthermore, by making the width and depth of the shadow disappearing when pressed correspond to the travel quantity of the display screen, further favorable feeling of operation is obtained in this application example as well.

A third embodiment of a display unit with touch panel according to the present invention will now be described.

In the same way as the first and second embodiments, the third embodiment also has the configuration shown in FIGS. 1A to 6. In the third embodiment, the display screen 2 can assume an arbitrary drive quantity.

Figure 16:
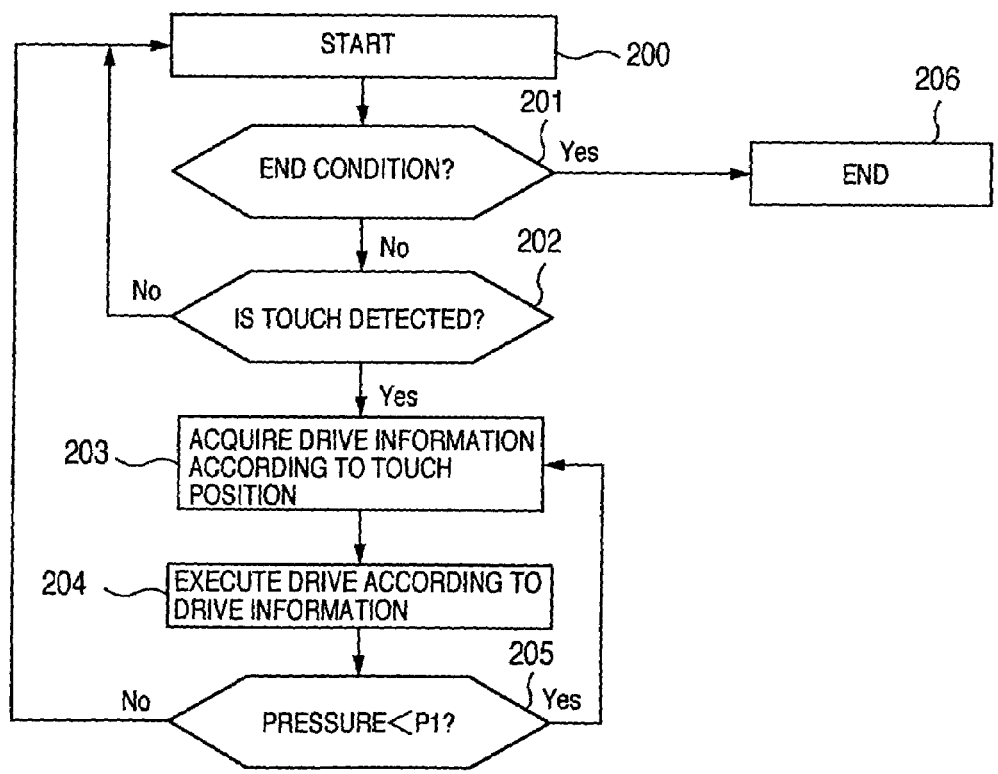
FIG. 16 is a flow chart showing control operation in a third embodiment of a display unit with touch panel according to the present invention.

FIG. 16 is a flow chart showing control operation of the control section 20 (FIG. 6) in the third embodiment. Hereafter, its operation will be described with reference to display examples on the screen.

Figure 17A:
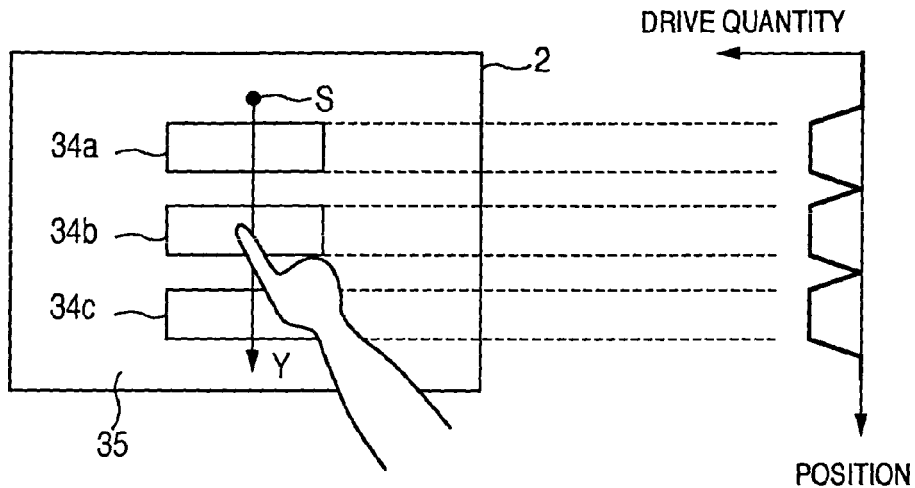
FIGS. 17A, 17B and 17C are diagrams showing screen examples on a display screen in operation shown in FIG. 16.
Figure 17B:
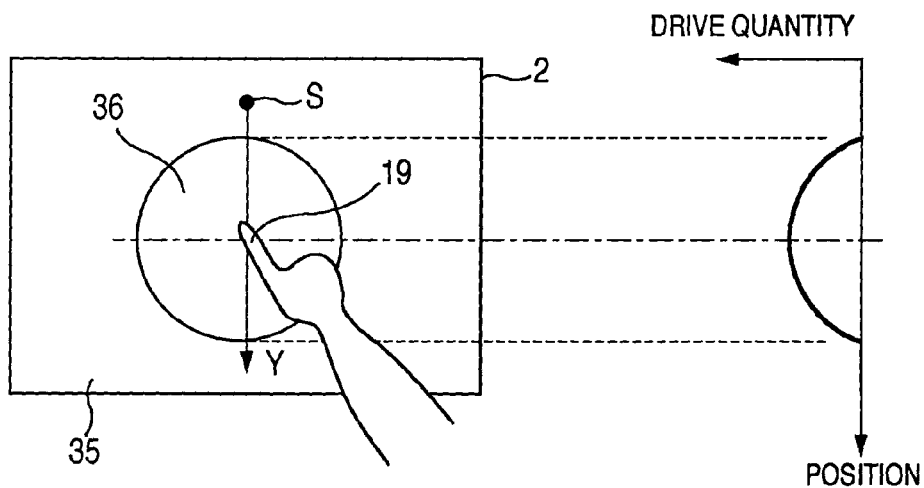
Figure 17C:
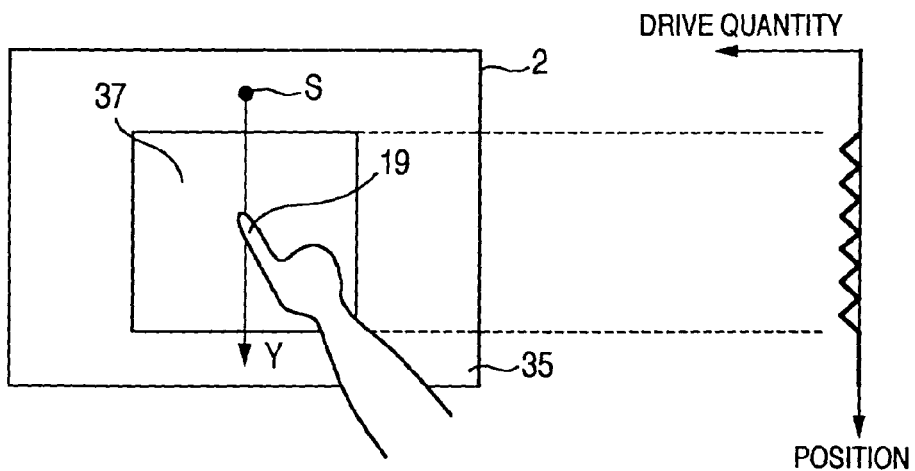

FIGS. 17A, 17B and 17C show examples of a picture displayed on the display screen 2 in the control operation. It is now supposed that an initial position of the display screen 2 is an intermediate position between a position in the state shown in FIG. 2, (a) and a position in the state shown in FIG. 2, (c).

With reference to FIGS. 17A to 17C, if power supply, which is not illustrated, is turned on, then the control section 20 brings the display unit into the operation start state (step 200). It is now supposed that, for example, images indicating projections (hereafter referred to as projections) 34a to 34c are displayed on the display screen 2 as shown in FIG. 17A. And it is determined whether the end condition of the operation has been established by, for example, turning off the power supply (step 201). If the end condition of the operation has been established, the operation ends (step 206). If the end condition of the operation has not been established, then the detected pressure P is taken in from the pressure sensor shown in FIG. 6, and it is determined whether the relation P≧P1 is satisfied (step 202). If P<P1, then even the touch operation on the touch panel 9 (FIGS. 1A to 3B) is regarded as not conducted, and the control section 20 returns to the step 200. Until touch operation is conducted, the series of operations 200 to 202 are repeated and the display screen 2 remains to be set to the initial position.

It is now supposed that a point S in an area (hereafter referred to as background area) 35 other than the projections 34a to 34c on the display screen 2 is touched by the fingertip 19 as shown in FIG. 17A and the fingertip 19 is moved in a direction indicated by an arrow Y so as to cross the projections 34a to 34c while keeping the fingertip 19 in contact with the display screen 2. When the fingertip 19 has touched the point S, the control section 20 detects the touch because the pressure P detected by the pressure sensor has become P1≦P (the step 202). In addition, the control section 20 senses that the touch position is in the background area 35 on the basis of the touch position detected by the touch sensor and the data in the storage section 22 (FIG. 6), and waits while maintaining the initial state (step 203). If the fingertip 19 is detached from the touch panel 9, then the pressure P becomes P<P1, and consequently the control section 20 returns to the step 200 and then the series of operations in the steps 200 to 202 are repeated.

If the fingertip 19 is moved in the direction indicated by the arrow Y while maintaining the contact with the touch panel 9, then the fingertip 19 arrives at the projection 34a. While sensing that the fingertip 19 is touching the touch panel 9 on the basis of the pressure P detected by the pressure sensor (FIG. 6), the control section 20 senses that the touch position is in the area of the projection 34a on the basis of the touch position detected by the touch sensor and the data in the storage section 22. The control section 20 rotates and controls the drive motor 11 (FIGS. 1A to 3B), drives the link mechanism 14, and brings the display screen 2 into the state shown in FIG. 2, (a) (step 204). As a result, the display screen 2 is lifted from the initial position.

If the fingertip 19 has moved in the direction indicated by the arrow Y and the touch is continued (step 205), then the control section 20 returns to the step 203. So long as the fingertip 19 touches the touch panel 9, the series of operations in the steps 203 to 205 are repeated. If the touch position of the fingertip 19 comes in the background area 35 between the projections 34a and 34b by the movement of the fingertip 19 in the direction indicated by the arrow Y, then the control section 20 detects it, rotates the drive motor 11 in the opposite direction, drives the link mechanism 14, and returns the display screen 2 to the initial position. And if the fingertip 19 comes in the area of the next projection 34b, then the control section senses it, moves the display screen 2 to the position in the state shown in FIG. 2, (a) in the same way, and thereby bring the display screen 2 into the lifted state.

Thus, each time the touch position of the fingertip 19 moves from the background area 35 to the area of the projections 34a to 34c, the display screen 2 shifts from the state of the initial position to the lifted state shown in FIG. 2, (a). On the other hand, each time the touch position of the fingertip 19 moves from the area of the projections 34a to 34c to the background area 35, the display screen 2 shifts from the state shown in FIG. 2, (a) to the state of initial position, in which the display screen 2 is lowered. If the fingertip 19 is moved in the direction indicated by the arrow Y on the display screen 2 shown in FIG. 17A while maintaining the touch state, therefore, the display screen 2 is lifted for each of the projections 34a, 34b and 34c. Thus, the customer feels as if the projections 34a, 34b and 34c project from the screen.

If the projections 34a to 34c represent depressed hollows, then the display screen 2 is moved from the initial position to the position in the state shown in FIG. 2, (c).

FIG. 17B shows another display example on the display screen 2. It is supposed that a projection 36 displayed on the display screen 2 is a bowl-shaped projection. The operation shown in FIG. 16 conducted for this display example will now be described.

On the display screen 2 shown in FIG. 17B, the fingertip 19 is moved from a position S in a background area 35 in a direction indicated by an arrow Y so as to cross the projection 36 while keeping the fingertip 19 in contact with the touch panel 9. Before the fingertip 19 touches the position S, the series of operations in the steps 200 to 202 are repeated. If the fingertip 19 touches the touch panel 9 and the pressure satisfying the relation P1<P is detected (the step 202), then the control section 20 proceeds to the step 203, and continues to keep the display screen 2 in the initial state shown in FIG. 2, (c).

And if the touch position of the fingertip 19 comes in the projection 36, then the control section 20 detects it in the same way as the preceding description, controls rotation of the drive motor 11, and drives the link mechanism 14 (the step 204). With respect to the projection 36, which changes in height according to the position, data showing the relation between the position and the height are stored in the storage section 22 (FIG. 6). The control section 20 reads height data corresponding to the detected touch position from the storage section 22, controls rotation of the drive motor 11 (FIG. 6) according to the height data, and drives the link mechanism with a drive quantity according to the height data. As a result, the display screen 2 is driven with a drive quantity, which changes in, for example, a circular arc form as shown in FIG. 17B. As the touch position of the fingertip 19 proceeds to a central part of the projection 36 from its peripheral part, therefore, the display screen 2 in the initial position is continuously moved in a direction opposite to that indicated by the arrow A and thereby gradually lifted, resulting in the state shown in FIG. 2, (a). Subsequently, as the touch position of the fingertip 19 proceeds to the peripheral part of the projection 36 from its central part, the display screen 2 is continuously moved in the direction indicated by the arrow A from the state shown in FIG. 2, (a), and thereby gradually lowered, and returned to the original initial state.

Thus, for the projection represented to continuously change in height, the display screen 2 is continuously driven according to a change of the touch position. Therefore, the projection displayed on the plain display screen 2 can also be sensually recognized so as to project. In this way, it can be certainly recognized that the projection is touched. It can also be certainly known that actually the projection is not touched against the will. It is facilitated to determine whether the desired projection is touched.

When a hollow depressed in a bowl form is displayed instead of the projection 36, the display screen 2 is moved from the initial state to the state shown in FIG. 2, (c) at the step 204 shown in FIG. 16. In this case as well, effects similar to those obtained hen using the projection 36 are obtained.

Although the projection 36 has been supposed to be bowl-shaped, it may have a shape that arbitrarily changes in height or depth. For example, even if something like a map is displayed on the display screen in a two-dimensional form, it becomes possible to sensually recognize its height as well by moving the display screen 2 according to the height of the land surface as described above. It becomes possible to recognize the map as a map displayed in a three-dimensional form.

FIG. 17C shows still another display example on the display screen 2. It is supposed that a displayed projection 37 in FIG. 17C is a plain projection having a wide area. The operation shown in FIG. 16 conducted for this display example will now be described.

On the display screen 2 shown in FIG. 17C, the fingertip 19 is moved from a position S in a background area 35 in a direction indicated by an arrow Y so as to cross the projection 37 while keeping the fingertip 19 in contact with the touch panel 9. Before the fingertip 19 touches the position S, the series of operations in the steps 200 to 202 shown in FIG. 16 are repeated. If the fingertip 19 touches the touch panel 9 and the pressure satisfying the relation $P1 \leq P$ is detected (the step 202), then the control section 20 proceeds to the step 203, and continues to keep the display screen 2 in the initial state.

And if the touch position of the fingertip 19 comes in the projection 37, then the control section 20 detects it in the same way as the preceding description, controls rotation of the drive motor 11, and drives the link mechanism 14 (the step 204). With respect to such a plain projection 37 having a wide area, data for moving the display screen 2 from the initial position in the direction of the position shown in FIG. 2, (a) and vibrating the display screen 2 are stored in the storage section 22 (FIG. 6). Upon detecting that the touch position of the fingertip 19 is in an area of the projection 37, the control section 20 reads data from the storage section 22, and controls reciprocating rotation of the drive motor 11. As a result, the drive motor 11 moves from the initial position in a direction of the position shown in FIG. 2, (a), and then alternately inverts the rotation direction little by little. As a result, the drive quantity changes as shown in FIG. 17C, and the display screen 2 vibrates.

When the touch position of the fingertip 19 has moved from the background area 35 to the area of the projection 37, it is a matter of course that the display screen 2 is moved from the initial position to the direction of the position shown in FIG. 2(a). In the case of the wide and plain projection 37 as shown in FIG. 17C, however, there is also a possibility that the touch position exists in such a projection 37 for a long time. In such a case, consciousness of touching the projection 37 is lost as time elapses. By vibrating the display screen as described above, however, it is possible to make the customer always recognize that the customer is touching the projection 37.

A plain projection 37 has been supposed as an example. When a plain hollow is used, however, the display screen is moved from the initial position to the direction of the position shown in FIG. 2(c) and vibration is caused there.

A fourth embodiment of a display unit with touch panel according to the present invention will now be described.

The fourth embodiment is obtained by changing the projectors in the third embodiment to operation buttons. Operation for the execution of the functions of the operation buttons is added to the operation of the third embodiment.

Figure 18:
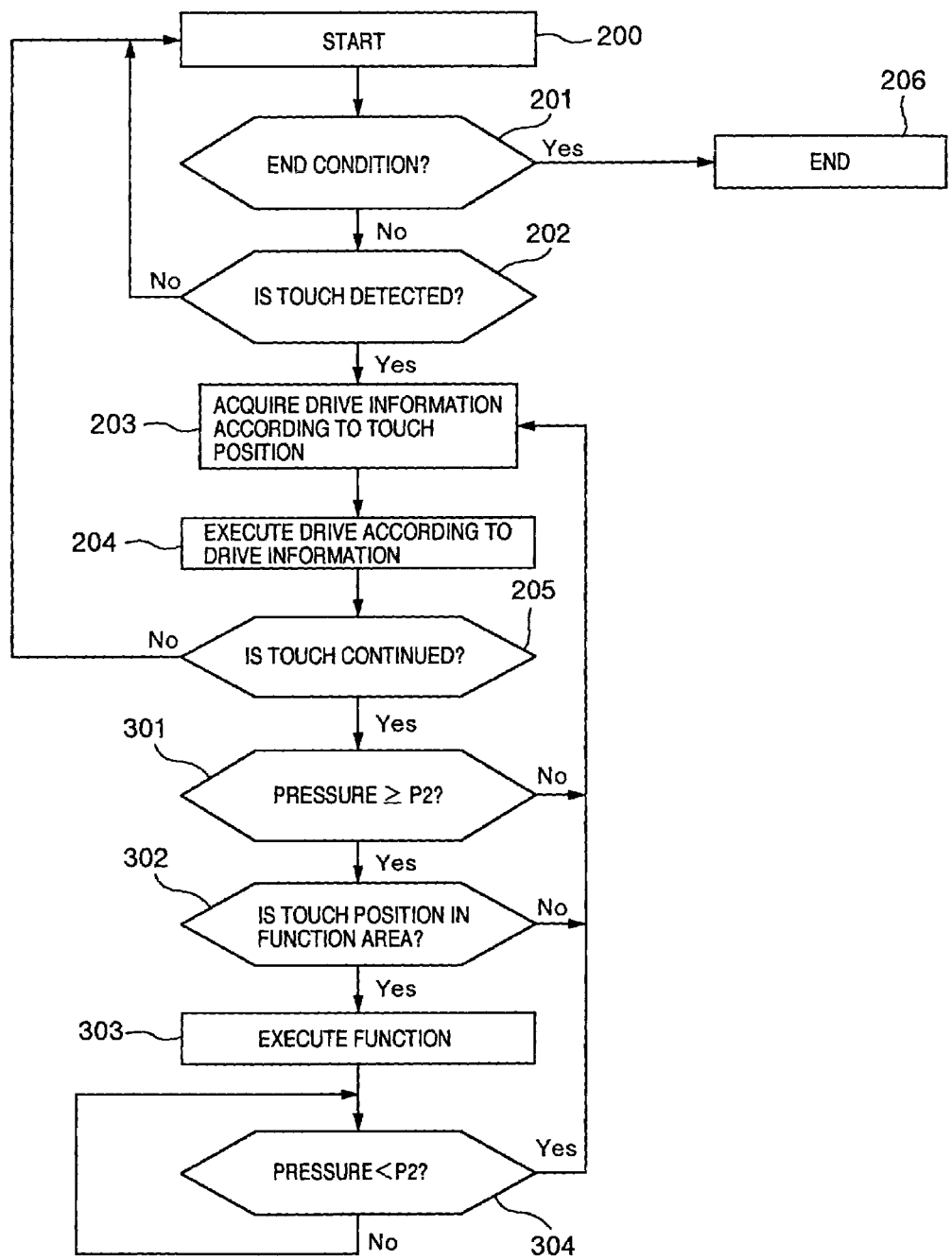
FIG. 18 is a flow chart showing control operation in a fourth embodiment of a display unit with touch panel according to the present invention.

FIG. 18 is a flow chart showing control operation in the fourth embodiment. Steps 200 to 206 are similar to those in the operation of the third embodiment shown in FIG. 16. It is now supposed that the projections 34a to 34c, 36 and 37 shown in FIGS. 17A to 17C are operation buttons.

Figure 19:
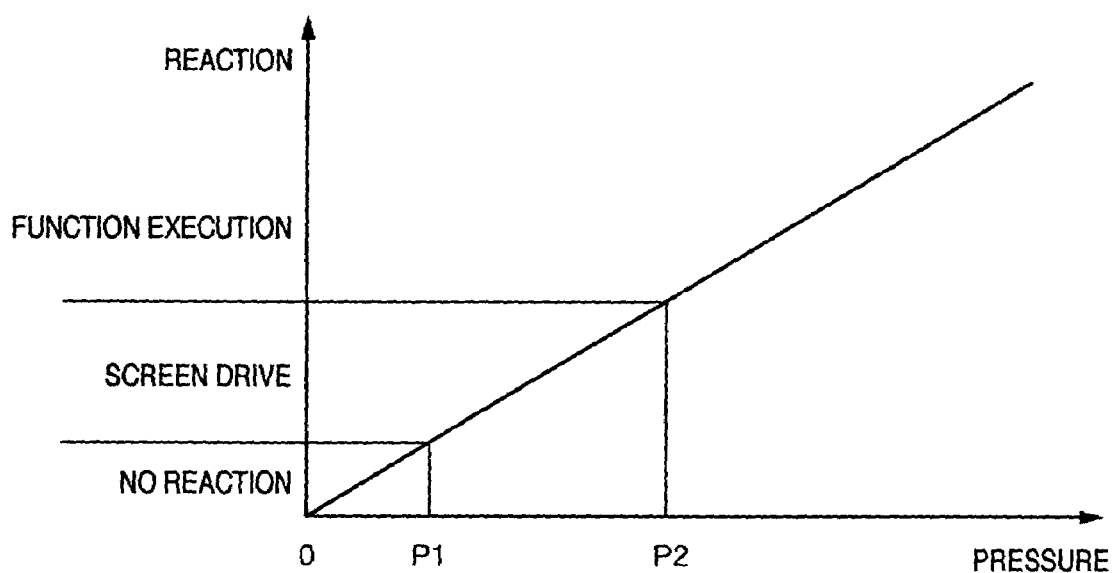
FIG. 19 is a diagram showing action (operation) exerted on a display screen as a function of a detected pressure in operation shown in FIG. 18.

FIG. 19 is a diagram showing an action (reaction) on the display screen as a function of the pressure P in the fourth embodiment.

In FIG. 19, a series of operations conducted at steps 200 to 206 are similar to those described with reference to FIG. 16, and description thereof will be omitted. Although the operation buttons as shown in FIGS. 17A to 17C are displayed on the same display screen 2, it is supposed that operation buttons differing in shape and size are different in function and use as well.

When the fingertip 19 touches an operation button and the pressure is P1≦P<P2 as described with reference to FIG. 16, the display screen 2 is driven as shown in FIG. 19. For each of the operation buttons 34a to 34c, 36 and 37 respectively shown in FIGS. 17A, 17B and 17C, the way of driving the display screen 2 is different (the step 204). As a result, the operation buttons are different in function and use. Thus, it is possible to sensually recognize that a desired operation button has been touched.

In the state heretofore described, the customer conducts operation of pressing an operation button touched by a fingertip 19. The pressure P detected by the pressure sensor at that time becomes P2≦P (step 301). If the touch position of the fingertip 19 at that time is in an area of an operation button (step 302), then the control section 20 executes the function (such as determination) of the operation button (step 303). If the operation of pressing the operation button is finished (step 304), then the control section 20 returns to the step 203, and waits for the next operation.

Thus, in the fourth embodiment, the way of driving the display screen 2 differs according to the operation button. Therefore, it can be known by tactile sensation which operation button has been touched.

A fifth embodiment of a display unit with touch panel according to the present invention will now be described.

Figure 20A:
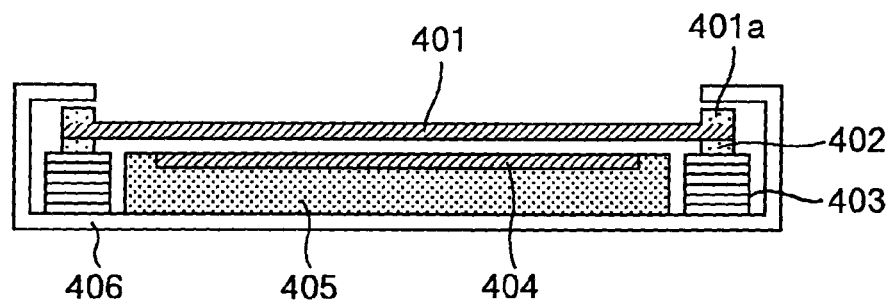
FIGS. 20A and 20B are configuration diagrams showing a fifth embodiment of a display unit with touch panel according to the present invention.
Figure 20B:
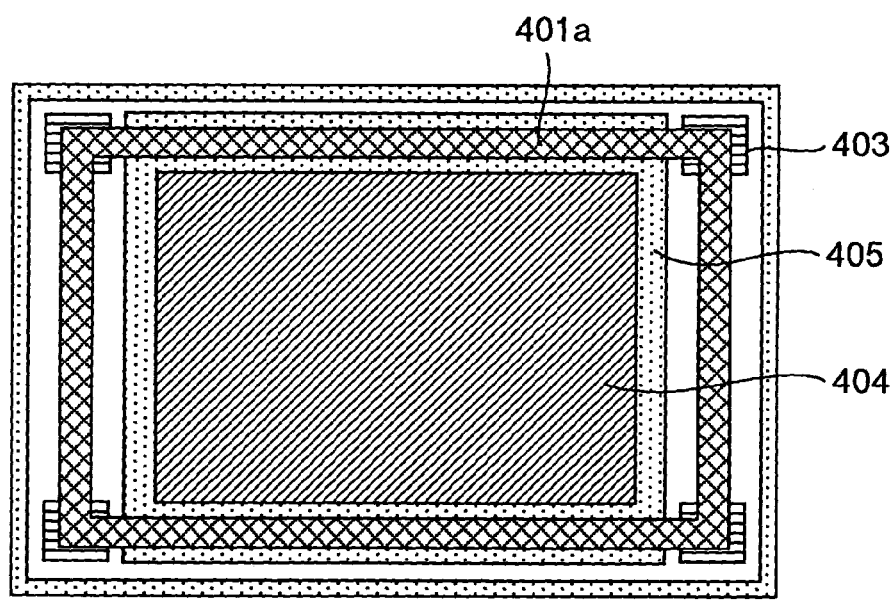

FIGS. 20A and 20B are configuration diagrams showing the fifth embodiment of a display unit with touch panel according to the present invention. FIG. 20A is a sectional view, and FIG. 20B is a top view. Reference numeral 401 denotes an infrared light scanning touch panel, 401a an infrared light receiving and emitting section, 402 a pressure sensor, 403 a drive unit, 404 a liquid crystal display screen, 405 a liquid crystal cabinet, and 406 an outside cabinet.

With reference to FIGS. 20A and 20B, the infrared light scanning touch panel 401 is provided in a rectangular opening formed in a top surface of the outside cabinet 406. The pressure sensors 402 are disposed in four corners under the touch panel 401. The drive units 403 are disposed further under the pressure sensors 402. Under the touch panel 401, the liquid crystal display 405 is disposed with the liquid crystal display screen 404 facing upward. The user ascertains contents displayed on the liquid crystal display screen via the touch panel 401, and conducts operation.

As shown in FIG. 20B, the infrared light scanning touch panel 401 has such a structure that the infrared light receiving and emitting section 401a is disposed around a rectangular touch panel. In this embodiment, an indicated position is detected by the infrared light scanning touch panel and the pressure is detected by the pressure sensor 402.

The pressure sensors 402 are disposed in four corners under the touch panel. The pressure sensors 402 detect force with which a pointing device such as a finger pushes the panel surface, in real time. Denoting pushing pressures sensed by the four sensors when a finger or the like does not touch the touch panel respectively by a0, b0, c0 and d0, and denoting pushing pressures sensed while operation is conducted with a finger or the like respectively by a, b, c and d, the force P with which the pointing device such as a finger pushes the panel surface is found from the following equation irrespective of the pointing position:

$$P=(a+b+c+d)-(a0+b0+c0+d0)$$

The drive units 403 are disposed further under the pressure sensors 402. In this embodiment, it is a main object to obtain the feeling of pushing a button. A drive unit having a good response performance, such as a solenoid coil or a voice coil, is adopted. If the drive range is approximately 2 mm, the feeling of pushing a button can be obtained.

According to the configuration shown in FIGS. 20A and 20B, the liquid crystal display 405 is fixed and only the touch panel 401 is driven. Therefore, the mass of the drive unit can be reduced, and the response performance of the drive can be improved. If the drive range is set equal to approximately 2 mm, then the parallax of contents displayed on the liquid crystal display screen poses no problem. Owing to adoption of an infrared light scanning touch panel as the pointing position detection means, the user can make the touch panel detect the position by sliding the pointing device, such as the finger, on the surface of the touch panel 401, without great force. The pointing position can be detected more easily and accurately. Similar effects can also be obtained by adopting a touch panel of capacitance type, besides the touch panel of infrared light scanning type.

Figures 21, 22:
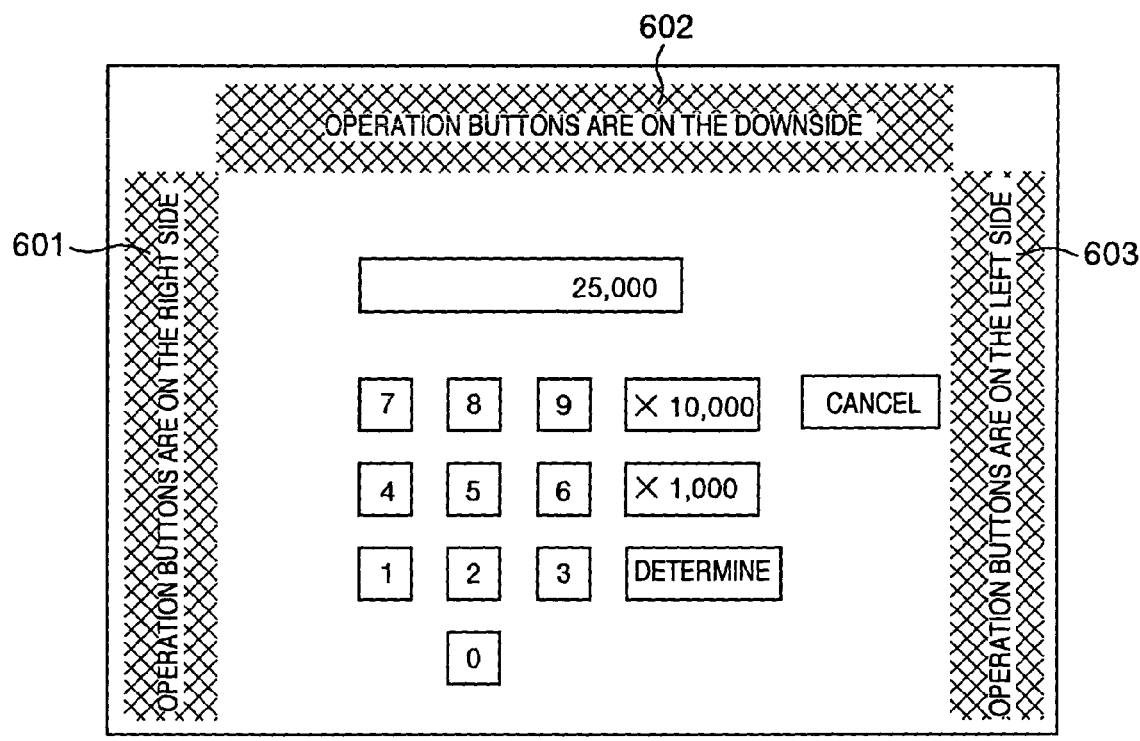
FIG. 21 is a diagram showing a display screen example obtained when a unit shown in a fifth embodiment is applied to an ATM.
FIG. 22 is a diagram showing a height of a panel plane of a touch panel shown in a fifth embodiment.
Figure 23:
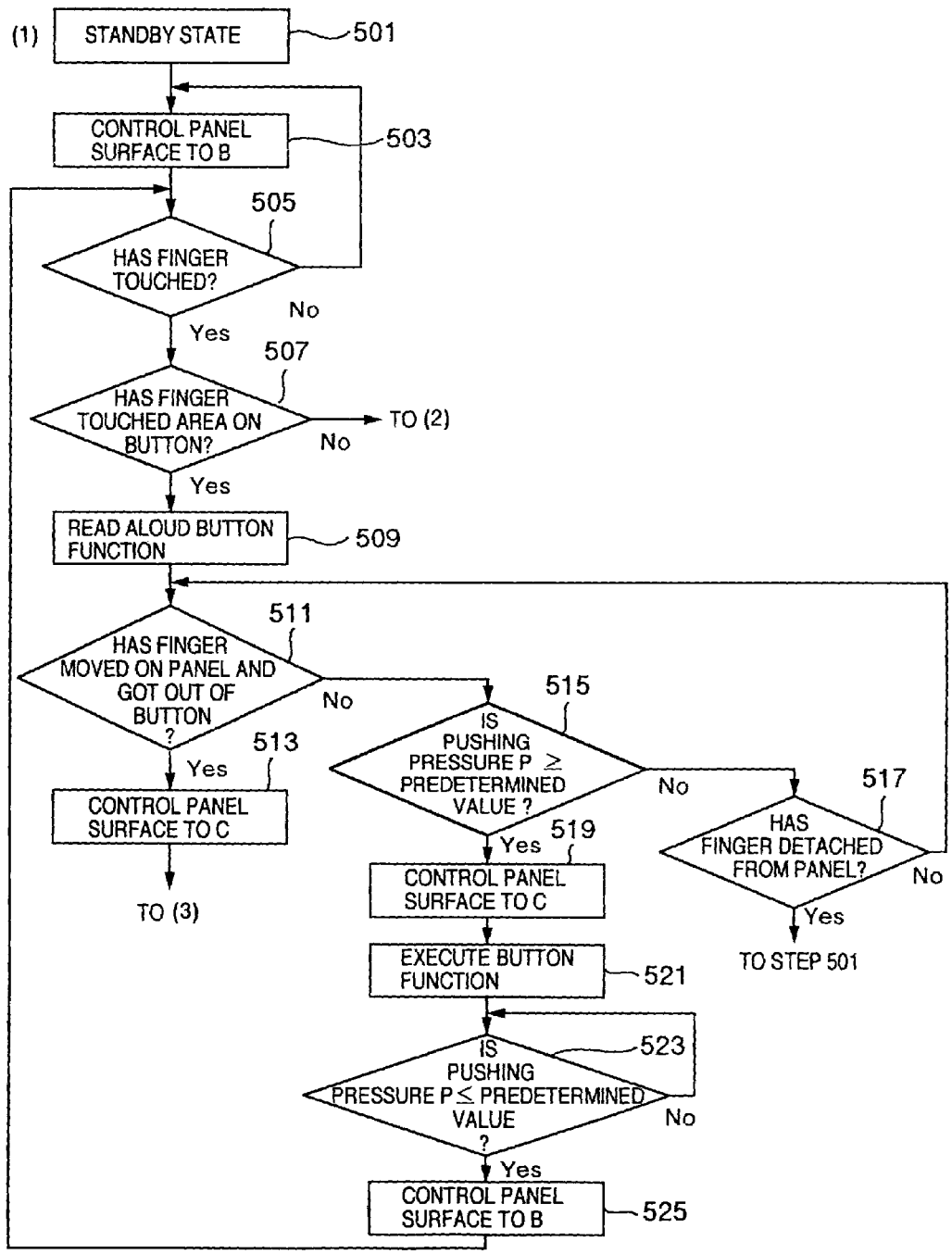
FIG. 23 is a flow chart showing operation of a unit shown in a fifth embodiment.
Figure 24:
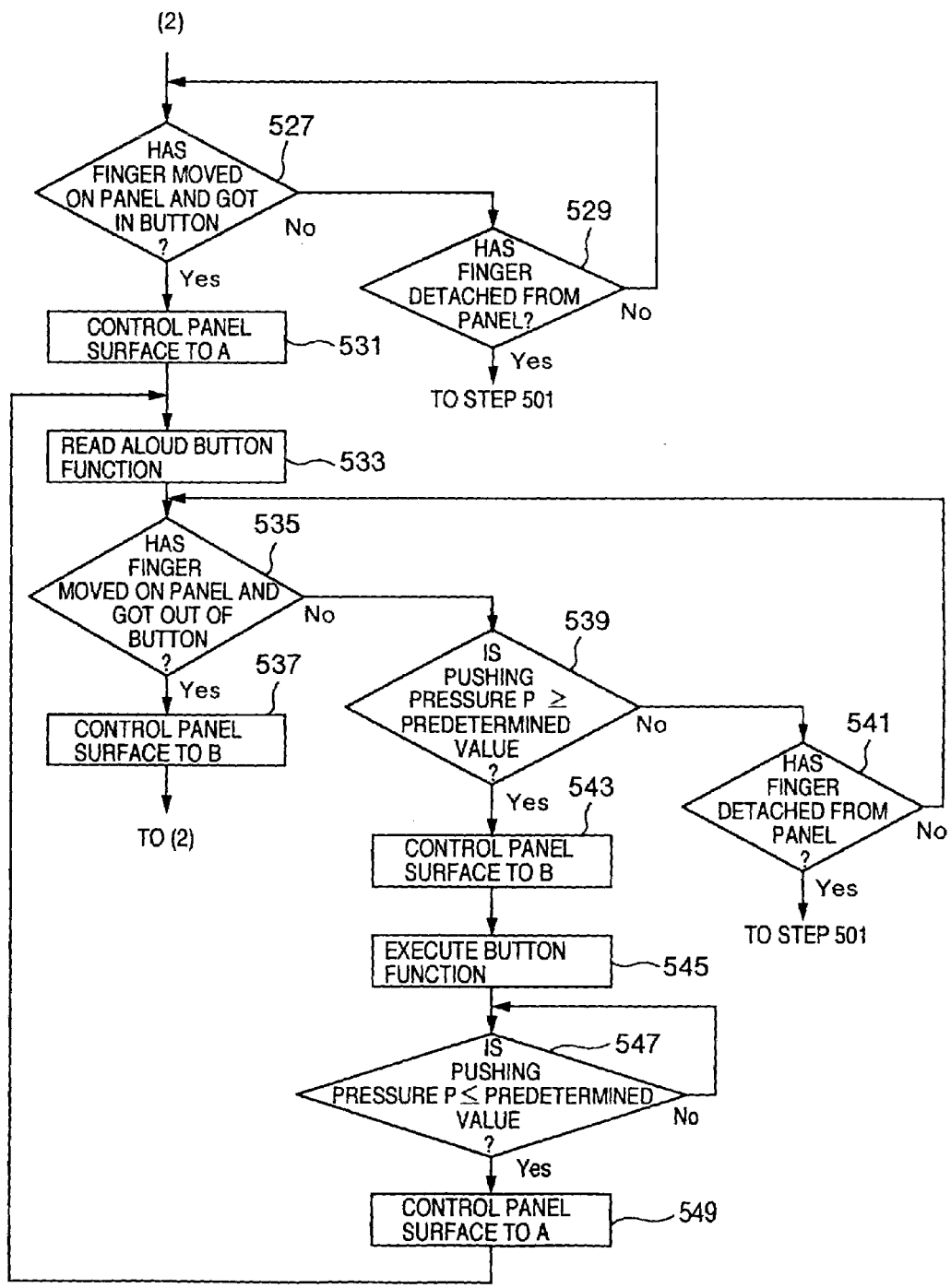
FIG. 24 is a flow chart showing operation of a unit shown in a fifth embodiment.
Figure 25:
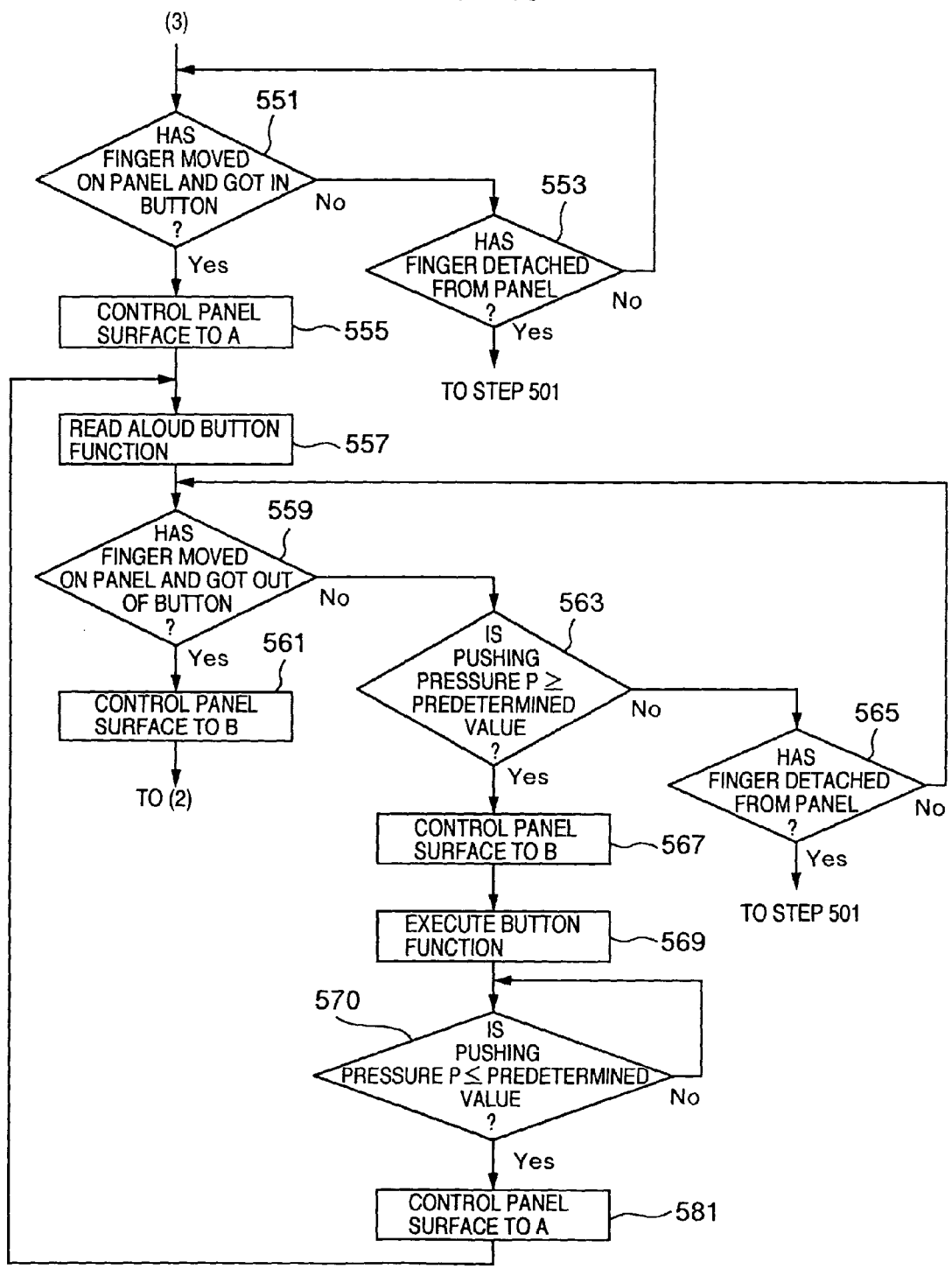
FIG. 25 is a flow chart showing operation of a unit shown in a fifth embodiment.

Operation of the display unit with touch panel according to this embodiment will now be described with reference to FIGS. 21 to 25. FIG. 21 shows a display screen example at the time when the unit has been applied to an ATM. FIG. 22 shows the height of a panel surface of the touch panel 401. FIGS. 23 to 25 are flow charts showing operation of the unit.

With reference to FIG. 23, power supply to the unit is turned on. If a finger or the like does not touch the touch panel 401, i.e., a pointing position is not detected by the touch panel 401, then the unit is brought to a standby state (step 501), and the height of the panel surface is controlled (step 503) to become a level B shown in FIG. 22 (step 503). FIG. 22 shows the height of the panel surface of the touch panel 401 controlled by the drive unit 403. In this example, a level L is a level of the highest limit and 0 is a level of the lowest limit. The height of the panel surface can also be controlled to become any of three levels A to C between the level L and the level 0. It is determined by the infrared light scanning touch panel 401 whether the pointing device such as the finger has touched the panel (step 505). If the panel is not touched, then the processing returns to the step 503. If the panel is touched, then it is determined whether the place where the pointing device has touched is on a displayed operation button (step 507). If the place where the pointing device has touched is not on a displayed operation button, then the processing proceeds to (2) shown in FIG. 24. If the place where the pointing device has touched is on a displayed operation button, then the function of the button is read aloud with voice (step 509). In this state, it is determined whether the pointing device such as the finger moves on the touch panel 401 and has got out of the area of the operation button (step 511). If the pointing device has got out of the area of the operation button, then the height of the panel surface is controlled to become the level C, which is one step lower the preceding level B (step 513), and the processing proceeds to (3) shown in FIG. 25. Otherwise, it is determined whether the pushing pressure P caused by the pointing device is at least a predetermined value (step 515). By controlling the height of the panel surface to become one step lower when the pointing position has got out of the operation button at the step 513, the operator can tactually feel that the position indicated by the operator is not on the operation button. As a result, it is possible to make even a visually handicapped person or a user who is not familiar with the operation grasp easily and certainly that the pointing position is out of the operation button. If the pushing pressure P is not at least the predetermined value at the step 515, then it is determined whether the finger is detached from the touch panel 401 (step 517). If the finger is not detached, then the processing returns to the step 511. If the finger is detached, then the processing returns to the standby state in the step 501. If the pushing pressure P is at least the predetermined value at the step 515, then the panel surface of the touch panel 401 is controlled to have the level C (step 519) and the function of the operation button is executed (step 521). By providing the panel surface with the level C, which is one step lower, at the time of function execution of the operation button, the user can get a feel as if the operation button is pressed. Thus the user can tactually grasp that the operation has been executed. Thereafter, it is determined whether the pushing pressure P has become a predetermined value or less (step 523). If the pushing pressure P has become the predetermined value or less, then the panel surface is controlled to have the original level, i.e., the level B (step 525) and the processing returns to the step 505.

The operation flow (2) shown in FIG. 24 will now be described. If the pointing position given by the pointing device such as the finger is not on the operation button at the step 507, then it is determined whether the finger or the like moves on the panel and comes in an area on an operation button (step 527). If the finger or the like has not come in an area on an operation button, then it is determined whether the finger or the like has detached from the panel (step 529). If the finger or the like has detached from the panel, then the processing returns to the standby state in the step 501. If the finger or the like has not detached from the panel, then the processing returns to the step 527. If the pointing position is not on the operation button, it is considered that the user is a visually handicapped person or remarkably unfamiliar with the operation. For example, it is supposed that there is a group of operation buttons on a part of the display screen as shown in FIG. 21. When a position in the areas 601 to 603 located at a distance from the operation buttons is indicated, it is also effective to guide the pointing position onto the operation button group by reading aloud a speech guidance such as "there are operation buttons on the right side (the left side or the downside." As a result, a visually handicapped person or a user who is unfamiliar with the operation can search for an operation more rapidly or easily. The areas 601 to 603 do not have the function of operation buttons. If an area in the areas 601 to 603 is indicated, however, then a guidance or an advice concerning the operation is read aloud with voice. Furthermore, if an area in the areas 601 to 603 is indicated, it is also possible to inform the user that the finger or the like is at a distance from the operation buttons, by vibrating the panel little by little instead of the voice guidance. If the processing returns to the step 527 and the finger or the like moves on the panel and comes in an area of an operation button, then the height of the panel surface of the touch panel 401 is controlled to become the level A, which is one step higher than the preceding level (step 531), and the function of the operation button is read aloud with voice (step 533). Thereafter, it is determined whether the finger or the like moves on the panel and gets out of the area of the operation button (step 535). If the finger or the like gets out of the area of the operation button, then the height of the panel surface of the touch panel 401 is controlled to become the original level B (step 537), and the processing returns to the step 527. If the finger or the like does not get out of the area of the operation button, then it is determined whether the pushing pressure P is at least a predetermined value (step 539). If the pushing pressure P is not at least a predetermined value, then it is determined whether the finger or the like is detached from the panel (step 541). If the finger or the like is not detached from the panel, then the processing returns to the step 535. If the finger or the like is detached from the panel, then the processing returns to the standby state in the step 501. If the pushing pressure P is at least a predetermined value at the step 539, then the height of the panel surface of the touch panel 401 is controlled to become the level B, which is one step lower than the preceding level (step 543), and the function of the operation button is executed (step 545). By setting the height of the panel surface to the level B, which is one step lower, at the time of function execution of the operation button, the user can obtain a feel as if the operation button is pressed, and can tactually grasp that the operation has been executed. As a result, it is possible to easily inform a visually handicapped person or a user unfamiliar with the operation of the touch panel, who is high in probability of following the operation flow (2), that the operation has been executed. Thereafter, it is determined whether the pushing pressure P has become a predetermined value or less (step 547). If the pushing pressure P has become the predetermined value or less, then the panel surface is controlled to become the original level, i.e., the level A (step 549), and the processing returns to the step 533.

The operation flow (3) shown in FIG. 25 will now be described. If the pointing position given by the pointing device such as the finger moves on the panel and gets out of the operation button at the step 511, then the panel surface is controlled to have the original level C (step 513) and it is determined whether the finger or the like moves on the panel and comes in an area on an operation button (step 551). If the finger or the like has not come in an area on an operation button, then it is determined whether the finger or the like has detached from the panel (step 553). If the finger or the like has detached from the panel, then the processing returns to the standby state in the step 501. If the finger or the like has not detached from the panel, then the processing returns to the step 551. If the finger or the like moves on the panel and comes in an area on an operation button at the step 551, then the panel surface of the touch panel 401 is controlled to have the level A, which is one step higher than the preceding step (step 555) and the function of the operation button is read aloud with voice (step 557). Thereafter, it is determined whether the finger or the like moves on the panel and gets out of the area of the operation button (step 559). If the finger or the like gets out of the area of the operation button, then the height of the panel surface of the touch panel 401 is controlled to become the original level B (step 561), and the processing returns to the step 527. If the finger or the like does not get out of the area of the operation button, then it is determined whether the pushing pressure P is at least a predetermined value (step 563). If the pushing pressure P is not at least a predetermined value, then it is determined whether the finger or the like is detached from the panel (step 565). If the finger or the like is not detached from the panel, then the processing returns to the step 559. If the finger or the like is detached from the panel, then the processing returns to the standby state in the step 501. If the pushing pressure P is at least a predetermined value at the step 563, then the height of the panel surface of the touch panel 401 is controlled to become the level B, which is one step lower than the preceding level (step 567), and the function of the operation button is executed (step 569). By setting the height of the panel surface to the level B, which is one step lower, at the time of function execution of the operation button, the user can obtain a feel as if the operation button is pressed, and can tactually grasp that the operation has been executed. As a result, it is possible to easily inform a visually handicapped person or a user unfamiliar with the operation of the touch panel, who is high in probability of following the operation flow (3), that the operation has been executed. Thereafter, it is determined whether the pushing pressure P has become a predetermined value or less (step 570). If the pushing pressure P has become the predetermined value or less, then the panel surface is controlled to become the original level, i.e., the level A (step 581), and the processing returns to the step 557.

In the description of the operation flows, the height of the panel surface of the touch panel 401 is controlled to become one of three steps A, B and C. This is an example in the case where the panel surface is driven supposing that all operation buttons have the same level. In this case, it is necessary to set at least three levels. Besides, it is also possible to change the height according to the kind of the operation button. For example, the determination button is made higher than numerical buttons. If a plurality of levels are supposed, it is necessary to control the panel surface to assume any of at least four levels.

If the height control of the panel surface is relative, it is possible to represent the positions and function execution of operation buttons. For example, in the case where the panel surface is controlled to assume the level A in order to represent that the operation button is touched at the step 531, and thereafter its function is executed and the panel surface is controlled to assume a low level (the step 543), it is not always necessary to control the panel surface to become the original level B, but the height of the panel surface may be set to an arbitrary level between the level 0 of the lower limit in height control and the level A.

In this embodiment, the panel surface is controlled to become the same level (the level B) when the touch panel is first touched, whether the pointing position is on an operation button or not (step 503). In other words, if an area on an operation button is indicated from the beginning and the function of the operation button is executed as it is, then the panel is controlled to have a level lower than the level at the beginning, and the user can obtain a feel as if the operation button is pressed. If the user indicates an area other than operation buttons and then indicates an area on an operation button, then the panel surface is controlled to become a level higher than the original level, and the user can feel as if the operation button projects. In this way, the height of the panel surface is controlled by taking the level touched at the beginning as reference. It is prevented that the panel surface is controlled to become a high level the moment the user has first touched an operation button. Thus the panel surface height control that hardly provides the user with a sense of incompatibility can be implemented.

In the case where there is a pointing device such as a finger on an operation button, its function is executed by applying a pushing pressure of at least a predetermined value as described above. The predetermined value of the pushing pressure can also be changed according to the kind of the operation button. For example, it is possible to make the predetermined value for the determination button greater than the predetermined values for numerical buttons so that the function of the determination button will be executed only when it is pushed harder.

According to the embodiments heretofore described, operation of the touch panel conducted by, for example, a visually handicapped person without relying on the vision can be implemented.

When a visually handicapped person operates the touch panel, the person, for example, touches the surface of the touch panel with one finger, and slides the finger over the entire screen so as to scan the touch panel surface with the finger. According to the present embodiment, the moment the finger gets on an operation button from an area having no operation buttons, the drive unit is activated to set the height of the entire screen to a predetermined level (the step 531) and read the function of the operation button aloud with voice (the step 533). The moment the finger gets out of the operation button, the height of the screen returns to the original level (the step 537). While the person is searching for a desired operation button, i.e., while the person is just touching the screen, the function of the operation button is not executed. If the panel surface is pushed with pusing pressure of at least a predetermined value when the finger is on the operation button, then the drive unit is activated to lower the height of the entire screen to a predetermined level (step 543) and execute the function of the operation button (step 545). At this time, the person may be informed that the function has been executed, with voice. After the force of the finger is removed after the execution, the drive unit returns the panel surface to the original level (the step 549).

Thus, by guiding the position and the function of an operation button with the screen drive and voice, the touch panel operation without relying on vision can be implemented.

When a visually handicapped person or a user unfamiliar with the touch panel operation conducts operation, it is conceivable that a plurality of places are indicated simultaneously. If a touch panel of a type capable of recognizing that there are a plurality of pointed places, such as infrared light scanning type or ultrasound type, is adopted, then voice guidance such as "Operate with a single finger" can be given when there are a plurality of pointed places. In addition, in the case where pointing to a plurality of places continue, it is also possible to take a measure such as making the explanation using voice slower and more comprehensible.

When touching operation buttons that represent numerals in order to input a secret identification number and an amount of money, it is not desirable for another person to hear the voice uttered when reading the contents aloud. In the case such contents, it is possible to adopt a method of vibrating the screen slightly as many times as the numeral instead of reading the numeral aloud with voice.

As heretofore described, according to the present invention, it is possible to tactually, easily and certainly ascertain that a desired touch operation member has been pressed.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A display unit with touch panel including a touch panel disposed on a display screen of a display panel to detect a touch position of a pointer, operation being conducted by touching a touch operation member displayed on the display screen, the display unit with touch panel comprising:

a sensor for sensing a pushing pressure P caused by the pointer when touching the touch operation member;

moving means for moving said display screen provided with said touch panel in a direction of the pushing pressure on said display screen; and a control section for conducting first processing concerning the touch operation member pushed by the pointer when the pressure P sensed by said sensor satisfies a relation $P1 \leq P < P2$ with respect to previously set pressures P1 and P2 (where P1<P2), and conducting second processing concerning the touch operation member pushed by the pointer when the pushing pressure P has changed from $P1 \leq P < P2$ to $P2 \leq P$, wherein when the pushing pressure P satisfies the relation $P1 \leq P < P2$, the display concerning said touch operation member is changed to be different by said first processing so that the display screen provided with said touch panel is moved in a direction of the pushing pressure, a moving quantity of the display screen being changed continuously according to an increase of the pushing pressure, and when the pushing pressure P has changed from $P1 \leq P < P2$ to $P2 \leq P$ where the touch operation member is regarded as pressed, a function of moving the display screen provided with said touch panel in a direction of pushing pressure caused by the pointer is executed and a predetermined processing assigned to the touch operation member is executed by the second processing, a changing rate of the moving quantity of the display screen responsive to the increase of the pushing pressure in said second processing being different from a changing rate of the moving quantity of the display screen in said first processing.

2. The display unit with touch panel according to claim 1, wherein the function of moving the display screen provided with said touch panel in a direction of pushing pressure caused by the pointer is conducted by the first processing, and instead of the function of moving the display screen provided with said touch panel in a direction of pushing pressure caused by the pointer, a function of moving the display screen provided with said touch panel in a direction opposite to that of pushing pressure caused by the pointer is conducted by the second processing.

3. The display unit with touch panel according to claim 1, further comprising:

a memory for storing audio data; and a speaker for reproducing the audio data, wherein in addition to processing of making display concerning the touch operation member different, processing of generating a voice message from the speaker based on the audio data concerning the touch operation member read out from the memory is further conducted by the first processing.

4. The display unit with touch panel according to claim 1, wherein a moving quantity of the display screen in said second processing is changed continuously according to an increase of the pushing pressure P, and wherein the changing rate of the moving quantity of the display screen in said second processing increases rapidly as compared with the changing rate of the moving quantity in said first processing.

5. A display unit with touch panel including a touch panel disposed on a display screen of a display panel to detect a touch position of a pointer, operation being conducted by touching a touch operation member displayed on the display screen, the display unit with touch panel comprising:

a sensor for sensing a pushing pressure P caused by the pointer when touching the touch operation member;

moving means for moving said display screen provided with said touch panel in a direction of the pushing pressure on said display screen;

a control section for conducting first processing concerning the touch operation member pushed by the pointer when the pressure P sensed by said sensor satisfies a relation $P1 \leq P < P2$ with respect to previously set pressures P1 and P2 (where P1<P2), and conducting second processing concerning the touch operation member pushed by the pointer when the pushing pressure P has changed from $P1 \leq P < P2$ to $P2 \leq P$, wherein when the pushing pressure P satisfies the relation $P1 \leq P < P2$, the display concerning said touch operation member is changed to be different by said first processing, and when the pushing pressure P has changed from $P1 \leq P < P2$ to $P2 \leq P$ where the touch operation member is regarded as pressed, a function of moving the display screen provided with said touch panel in a direction of pushing pressure caused by the pointer is executed and a predetermined processing assigned to the touch operation member is executed by the second processing; and said display unit further comprising:

a storage section for storing data that represents a relation between a position and a height as regards contents displayed on the display screen, wherein said control section reads height data corresponding to coordinates of a detected touch position from said storage section, and conducts processing of moving the display screen provided with said touch panel with a drive quantity depending upon the height data by the first processing.

6. A display unit according to claim 5, wherein the moving of the display screen provided with said touch panel by the first processing is processing of moving the display screen to a predetermined first height, when a transition is effected from a state in which the pointer touches an area where the touch operation member is not displayed to a state in which the pointer touches an area where the touch operation member is displayed, and the moving of the display screen provided with said touch panel by the second processing is processing of moving the display screen provided with said touch panel to a predetermined second height wherein said first height is relatively higher than a height of the display screen provided with said touch panel in an immediately preceding state, and said second height is relatively lower than a height of the display screen provided with said touch panel in an immediately preceding state.

7. A display unit with touch panel including a touch panel disposed on a display screen of a display panel to detect a touch position of a pointer, operation being conducted by touching a touch operation member displayed on the display screen, the display unit with touch panel comprising:

a sensor for sensing a pushing pressure P caused by the pointer when touching the touch operation member;

moving means for moving said display screen provided with said touch panel in a direction of the pushing pressure on said display screen;

a memory for storing audio data;

a speaker for reproducing the audio data; and a control section for conducting first processing concerning the touch operation member pushed by the pointer when the pressure P sensed by said sensor satisfied a relation $P1 \leq P < P2$ with respect to previously set pressures P1 and P2 (where P1<P2 ), and conducting second processing concerning the touch operation member pushed by the pointer when the pushing pressure P has changed from $P1 \leq P < P2$ to $P2 \leq P$, wherein when the pushing pressure P satisfies the relation $P1 \leq P < P2$, a voice message is generated from the speaker based on the audio data concerning the touch operation member read out from the memory, and the display screen provided with said touch panel is moved in a direction of the pushing pressure, a moving quantity of the display screen being changed continuously according to an increase of the pushing pressure, and when the pushing pressure P has changed from $P1 \leqq P < P2$ to P2P where the touch operation member is regarded as pressed, a function of moving the display screen provided with said touch panel in a direction of pushing pressure caused by the pointer is executed and a predetermined processing assigned to the touch operation member is executed by the second processing, a changing rate of the moving quantity of the display screen responsive to the increase of the pushing pressure in said second processing being different from a changing rate of the moving quantity of the display screen in said first processing.

* * * * *